United States Patent
Shin et al.

(10) Patent No.: US 12,057,712 B2
(45) Date of Patent: Aug. 6, 2024

(54) MULTI-COIL ANTENNA, ELECTRONIC DEVICE, AND METHOD FOR CONNECTING MULTI-COIL ANTENNA IN ELECTRONIC DEVICE

(71) Applicant: Samsung Electronics Co., Ltd., Gyeonggi-do (KR)

(72) Inventors: Seungshik Shin, Gyeonggi-do (KR); Sangwoo Kang, Gyeonggi-do (KR); Kyungmin Park, Gyeonggi-do (KR); Baewon Park, Gyeonggi-do (KR); Juhyang Lee, Gyeonggi-do (KR); Jinsik Choi, Gyeonggi-do (KR); Jaeyoung Huh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 483 days.

(21) Appl. No.: 17/422,793

(22) PCT Filed: Jul. 9, 2021

(86) PCT No.: PCT/KR2021/008814
§ 371 (c)(1),
(2) Date: Jul. 14, 2021

(87) PCT Pub. No.: WO2022/014969
PCT Pub. Date: Jan. 20, 2022

(65) Prior Publication Data
US 2022/0352757 A1    Nov. 3, 2022

(30) Foreign Application Priority Data
Jul. 16, 2020    (KR) .......................... 10-2020-0088383

(51) Int. Cl.
*H02J 7/00*    (2006.01)
*H01Q 7/00*    (2006.01)
*H02J 50/12*    (2016.01)

(52) U.S. Cl.
CPC .............. *H02J 50/12* (2016.02); *H01Q 7/00* (2013.01); *H02J 7/00032* (2020.01)

(58) Field of Classification Search
CPC ......... H02J 50/12; H02J 7/00032; H01Q 7/00
See application file for complete search history.

(56) References Cited

U.S. PATENT DOCUMENTS

2016/0210615 A1    7/2016  Lee et al.
2017/0033615 A1*   2/2017  Asanuma ................ H02J 50/12
(Continued)

FOREIGN PATENT DOCUMENTS

KR    1020130112233 A    10/2013
KR    1020160090236 A    7/2016
(Continued)

OTHER PUBLICATIONS

International Search Report dated Oct. 18, 2021.

*Primary Examiner* — Robert Grant
(74) *Attorney, Agent, or Firm* — Cha & Reiter, LLC

(57) ABSTRACT

According to one embodiment, an electronic device comprises a battery, an antenna module including a first coil and a second coil, at least one switch electrically connected with the antenna module, a magnetic field controller electrically connected with the antenna module, a charger electrically connected with the battery and the magnetic field controller, and at least one processor electrically connected with the at least one switch, the magnetic field controller, and the charger. The at least one processor may be configured to, based on an operation mode associated with the antenna module, control the at least one switch to connect the first coil with the magnetic field controller, or to connect the first (Continued)

coil and the second coil in parallel and allow the first coil and the second coil connected in parallel to connect with the magnetic field controller. Other embodiments may be possible as well.

13 Claims, 19 Drawing Sheets

(56) References Cited

U.S. PATENT DOCUMENTS

| | | |
|---|---|---|
| 2017/0126070 A1 | 5/2017 | Lee et al. |
| 2017/0133889 A1 | 5/2017 | Yeo et al. |
| 2018/0301936 A1 | 10/2018 | Lee et al. |
| 2019/0363584 A1 | 11/2019 | Leem |

FOREIGN PATENT DOCUMENTS

| | | |
|---|---|---|
| KR | 10-2017-0043764 A | 4/2017 |
| KR | 1020170050656 A | 5/2017 |
| KR | 1020170054976 A | 5/2017 |
| KR | 1020180054187 A | 5/2018 |

* cited by examiner

MULTI-COIL ANTENNA, ELECTRONIC DEVICE, AND METHOD FOR CONNECTING MULTI-COIL ANTENNA IN ELECTRONIC DEVICE

CROSS-REFERENCE TO RELATED APPLICATION(S)

This application is a National Phase Entry of PCT International Application No. PCT/KR2021/008814, which was filed on Jul. 9, 2021, and claims priority to Korean Patent Application No. 10-2020-0088383 which was filed on Jul. 16, 2020, in the Korean Intellectual Property Office, the contents of which are incorporated herein by reference.

TECHNICAL FIELD

Various embodiments relate to a multi-coil antenna and an electronic device.

BACKGROUND ART

Power or data may be transmitted via magnetic induction using a coil of an electronic device. For example, power may be transmitted using various international standards, e.g., wireless power consortium (WPC) or alliance for wireless power (A4WP), and data may be transmitted using magnetic secure transmission (MST) or near field communication (NFC).

DETAILED DESCRIPTION OF THE INVENTION

Technical Problem

An antenna may be needed to transmit power or data using WPC, A4WP, MST, or NFC technology, and there may be restrictions regarding the area and thickness for mounting the antenna in a portable electronic device. When the antenna corresponding to a particular wireless communication technology includes a plurality of coils, it may be difficult to provide high coil performance due to interference from surrounding coils. The various wireless communication technologies may have different frequency characteristics and may have different inductances required for optimizing performance. Further, inductors (e.g., coils) having resonant frequencies close to each other may interfere with each other.

Technical Solution

In accordance with an embodiment, an electronic device comprises a battery, an antenna module including a first coil and a second coil, one or more switches electrically connected with the antenna module, a magnetic field controller electrically connected with the antenna module, a charger electrically connected with the battery and the magnetic field controller, and at least one processor electrically connected with the one or more switches, the magnetic field controller, and the charger. The at least one processor is configured to, based on an operation mode associated with the antenna module, control the one or more switches to connect the first coil with the magnetic field controller, or to connect the first coil and the second coil in parallel and allow the first coil and the second coil connected in parallel to connect with the magnetic field controller.

In accordance with an embodiment, an electronic device comprises a battery, an antenna module including a first coil, a second coil, and a third coil, a first switch and a second switch electrically connected with the antenna module, a magnetic field controller electrically connected with the antenna module, a charger electrically connected with the battery and the magnetic field controller, and at least one processor electrically connected with the first switch, the second switch, the magnetic field controller, and the charger. The at least one processor is configured to control the first switch and/or the second switch to be switched on or off in order to connect the first coil and the second coil in parallel and allow the first coil and the second coil connected in parallel to connect to the magnetic field controller based on a first mode associated with the antenna module, connect the first coil with the magnetic field controller based on a second mode associated with the antenna module, and connect the third coil with the magnetic field controller based on a third mode associated with the antenna module.

In accordance with an embodiment, a method for connecting coils of a multi-coil antenna in an electronic device comprises identifying a first mode among a plurality of operation modes associated with an antenna module of the electronic device, and controlling one or more switches to connect a first coil and a second coil of the antenna module in parallel and allow the first coil and the second coil connected in parallel to connect with a magnetic field controller based on the identified first mode.

In accordance with an embodiment, there is provided a non-volatile storage medium storing instructions executed by at least one processor to enable the at least one processor to perform at least one operation including identifying an operation mode associated with an antenna module of the electronic device, and controlling one or more switches to connect a first coil and a second coil of the antenna module in parallel and allow the first coil and the second coil connected in parallel to connect with a magnetic field controller based on identifying a first mode.

In accordance with an embodiment, a multi-coil antenna comprises a dielectric substrate, a first coil disposed in a first region on the dielectric substrate, a second coil disposed in a second region surrounding the first region, on the dielectric substrate, and a capacitor. The first coil and the second coil are connected in parallel and each have a designated number of turns for wirelessly transmitting power. The capacitor has a designated capacitance associated with an inductance and resistance for wirelessly transmitting power through the first coil and the second coil connected in parallel.

Advantageous Effects

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF DRAWINGS

The same or similar reference denotations may be used to refer to the same or similar elements throughout the specification and the drawings.

MODE FOR CARRYING OUT THE INVENTION

The terms as used herein are provided merely to describe some embodiments thereof, but not to limit the scope of other embodiments of the disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the disclosure.

Figure 1:
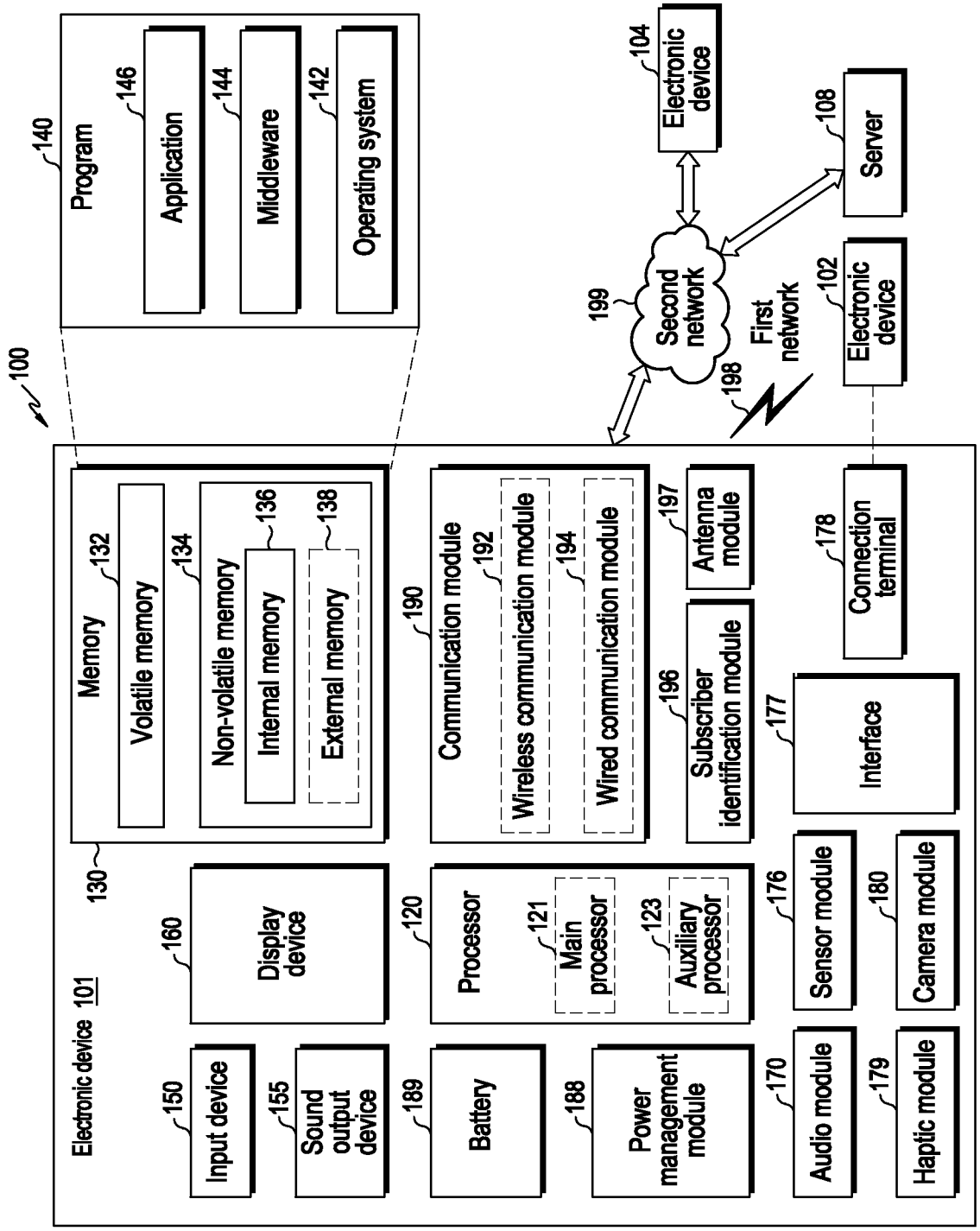
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
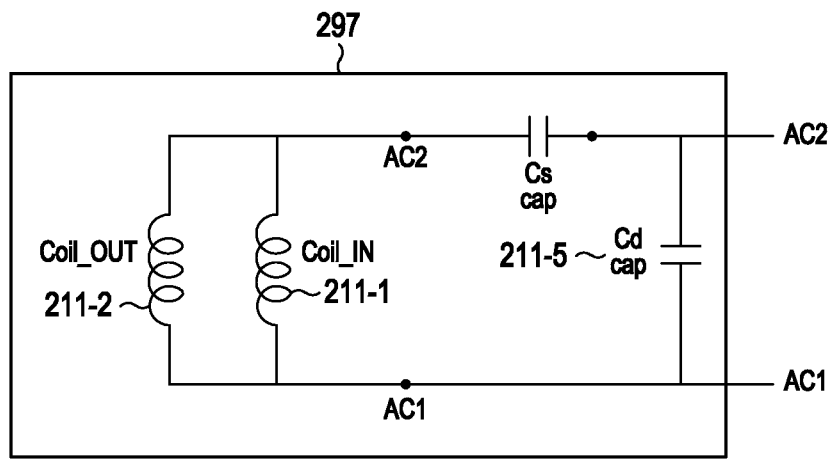
FIG. 2 is a view illustrating a parallel dual-coil antenna of an electronic device according to an embodiment.

FIG. 2 is a view illustrating a parallel dual-coil antenna of an electronic device according to an embodiment.

Referring to FIG. 2, according to an embodiment, an electronic device (e.g., the electronic device 101 of FIG. 1) may include a parallel dual-coil antenna circuit 297.

According to an embodiment, the parallel dual-coil antenna circuit 297 may include a first coil 211-1, a second coil 211-2, and capacitors 211-5. According to an embodiment, at least a portion (e.g., a first coil 211-1 and a second coil 211-2) of the parallel dual-coil antenna circuit 297 may be packaged integrally. According to an embodiment, the first coil 211-1 and the second coil 211-2 may be coils for wireless power transmission/reception (e.g., near field magnetic induction (NFMI)). According to an embodiment, the first coil 211-1 may be included at an inside Coil_IN of the parallel dual-coil antenna circuit 297, and the second coil 211 may be disposed at an outside Coil_OUT of the first coil 211-1. The first coil 211-1 and the second coil 211-2 may be connected in parallel. For example, the first coil 211-1 may be connected to an external circuit, and the second coil 211-2 may be connected in parallel with the first coil 211-1. According to an embodiment, the parallel dual-coil antenna circuit 297 may be a wireless power transmission antenna circuit. According to an embodiment, in the parallel dual-coil antenna circuit 297, the first coil 211-1 and the second coil 211-2 may have a specified length (or number of turns) suitable for wireless power transmission. According to an embodiment, the capacitors (Cs cap and Cd cap) 211-5 may have capacitances required to maintain a designated inductance and resistance when wirelessly transmitting power to an external electronic device through the first coil 211-1 and the second coil 211-2 connected in parallel.

Figure 3:
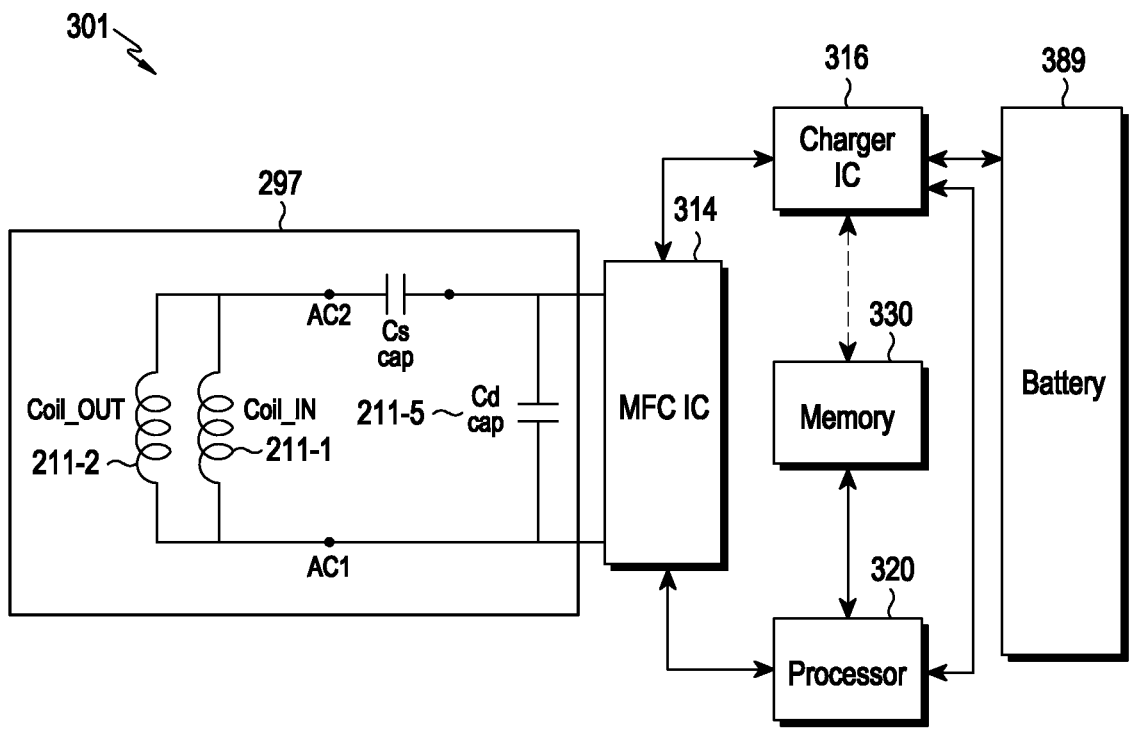
FIG. 3 is a block diagram illustrating an electronic device including a parallel dual-coil antenna circuit according to an embodiment.

FIG. 3 is a block diagram illustrating an electronic device including a parallel dual-coil antenna circuit according to an embodiment.

Referring to FIG. 3, according to an embodiment, an electronic device 301 (or a first electronic device) (e.g., the electronic device 101 of FIG. 1) may include all or some of the parallel dual-coil antenna circuit 297 (e.g., the antenna module 197 of FIG. 1), a magnetic field controller or magnetic field controller circuit or magnetic field controller integrated circuit (MFC IC) 314, a charger circuit or charger IC or charger 316, a processor 320 (e.g., the processor 120 of FIG. 1)), a memory 330 (e.g., the memory 130 of FIG. 1), and a battery 389 (e.g., the battery 189 of FIG. 1). The processor 320 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. According to an embodiment, the parallel dual-coil antenna circuit 297 may be configured as described with reference to FIG. 2. According to an embodiment, the MFC IC 314 may be connected to the parallel dual-coil antenna circuit 297. According to an embodiment, the MFC IC 314 may perform wireless power reception operation or wireless power transmission operation using the first coil 211-1 and the second coil 211-2 connected in parallel, which are part of the parallel dual-coil antenna circuit 297. According to an embodiment, the MFC IC 314 may include a wireless power reception circuit (not shown) for wireless power reception and a wireless power transmission circuit (not shown) for wireless power transmission. For example, upon receiving wireless power, the wireless power reception circuit may perform power processing, such as rectifying the alternating current (AC) waveform of power received through the first coil 211-1 and the second coil 211-2 connected in parallel into a DC waveform, converting the voltage, or regulating the power and transfer the same to the charger IC 316. In another example, upon transmitting wireless power, the wireless power transmission circuit may receive power from the charger IC, generate an AC waveform for power transmission, and generate a magnetic field through the first coil 211-1 and the second coil 211-2 connected in parallel based on the generated AC waveform to allow wireless power to be transmitted through the magnetic field.

According to an embodiment of the disclosure, the charger IC 316 may be connected between the MFC IC 314 and the battery 389. According to an embodiment, the charger IC 316 may charge the battery 389 using the power received through the MFC IC 314 and provide the power from the battery 389 to the MFC IC 314. The MFC IC 314 may generate a magnetic field at the parallel dual-coil antenna circuit 297 using the provided power to allow the power to be wirelessly transmitted to an external electronic device. As such, it is possible to allow the power from the battery 389 to be wirelessly shared with the external electronic device. According to an embodiment, the external electronic device may be one of various types of external electronic devices. For example, various types of external electronic devices may include a first external electronic device (e.g., a smartphone) that requires the reception of first power based on a first distance (or first center alignment accuracy) from the first electronic device 301 and a second external electronic device (e.g., an accessory device, smart watch, or wireless headset that may interwork with the first electronic device 301) that requires the reception of second power based on a second distance shorter than the first distance (or a second center alignment accuracy higher than the first center alignment accuracy). For example, the first coil 211-1 at the inside Coil_IN may be more particularly associated with the transmission/reception performance of the transceived wireless power to or from the second external electronic device (e.g., an accessory device, smart watch, or wireless headset) having a first size, and the second coil 211-2 at the outside Coil_OUT may be more particularly associated with the transmission/reception performance of the transceived wireless power to or from the first external electronic device (e.g., a smartphone) having a second size, where the second size—may be larger than the first size.

According to an embodiment, the processor 320 (e.g., the processor 120 of FIG. 1) may perform control operations related to wireless power reception or wireless power transmission.

According to an embodiment, the memory 330 (e.g., the memory 130 of FIG. 1) may store various control data and/or data tables used by at least one component (e.g., the processor 320 or the MFC IC 314) of the first electronic device 301. According to an embodiment, the memory 330 may store instructions to perform the operation of the electronic device 301. According to an embodiment, the memory 330 may be implemented in various forms, such as read only memory (ROM), random access memory (RAM), or flash memory, and is not limited to a specific implementation.

Figure 4A:
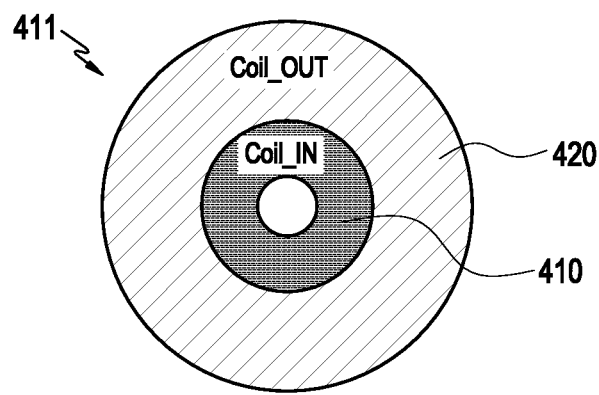
FIG. 4A is a view illustrating a first parallel dual-coil antenna according to an embodiment.
Figure 4B:
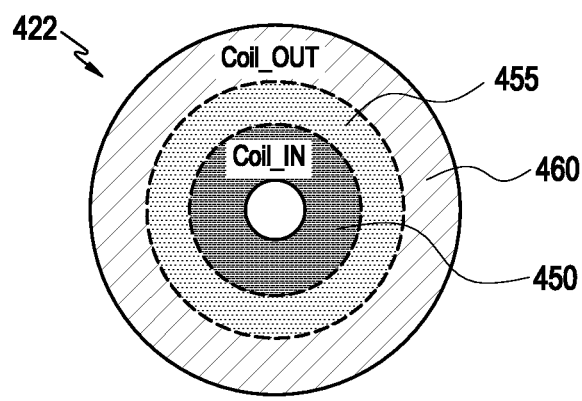
FIG. 4B is a view illustrating a second parallel dual-coil antenna according to an embodiment.

FIG. 4A is a view illustrating a first parallel dual-coil antenna according to an embodiment, and FIG. 4B is a view illustrating a second parallel dual-coil antenna according to an embodiment.

Referring to FIG. 4A, in the first parallel dual-coil antenna 411 according to an embodiment, a first coil (e.g., the first coil 211-1 in FIG. 2) may be disposed in a coil-in region 410, and a second coil (e.g., the second coil 211-2 of FIG. 2) may be disposed in a coil-out region 420. The coil-in region 410 and the coil-out region 420 of the parallel dual-coil antenna 411 may not overlap.

Referring to FIG. 4B, in the second parallel dual-coil antenna 422 according to an embodiment, a first coil (e.g., the first coil 211-1 of FIG. 2) may be disposed in a coil-in region 450, and a second coil (e.g., the second coil 211-2 of FIG. 2) may be disposed in a coil-out region 460. The coil-in region 450 and the coil-out region 460 may include an overlapping region 455. According to an embodiment, the second parallel dual-coil antenna 422 may be a parallel dual-coil superposition antenna.

Figure 5:
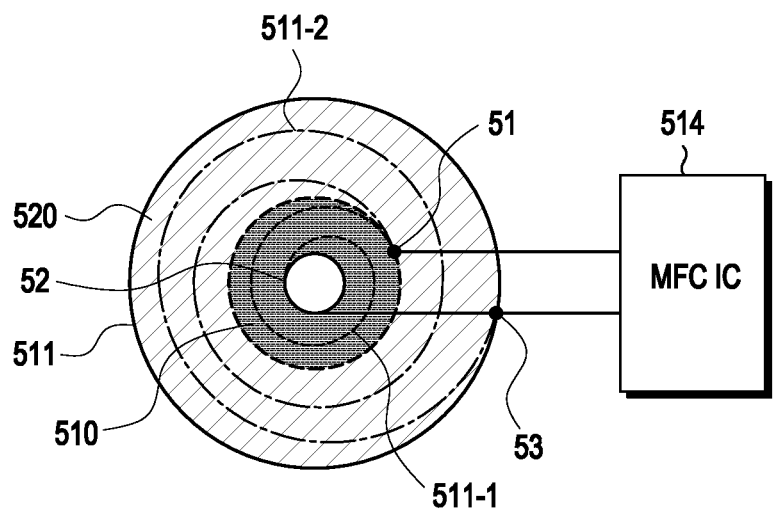
FIG. 5 is a view illustrating an example connection between a first parallel dual-coil antenna and an MFC IC according to an embodiment.

FIG. 5 is a view illustrating an example connection between a first parallel dual-coil antenna and an MFC IC according to an embodiment.

Referring to FIG. 5, according to an embodiment, the first parallel dual-coil antenna 511 may be an antenna in which a coil-in region 510 and a coil-out region 520 do not overlap. According to an embodiment, the first parallel dual-coil antenna 511 may have branches such as a first coil 511-1 and a second coil 511-2, and a first point 51 is the boundary point between the coil-in region 510 and the coil-out region 520 (e.g., where the outer diameter of the first coil 511-1 and the inner diameter of the second coil 511-2 meet).

According to an embodiment, the first coil 511-1 may be wound to have a designated number of turns from the first point 51 to a second point 52 (e.g., the innermost point of the coil-in region 510) inside the coil-in region 510, and the second point 52 may be connected with the MFC IC 514.

According to an embodiment, the second coil 511-2 may be wound to have a designated number of turns from the first point 51 to a third point 53 (e.g., the outermost point of the coil-out region 520) at the boundary of the coil-out region 520, and the third point 53 may be connected with the MFC IC 514. According to an embodiment, the first parallel dual-coil antenna 511 uses two coils, i.e., the first coil 511-1 and the second coil 511-2 connected in parallel, thereby increasing the recognition region for wireless power transmission/reception.

Figure 6A:
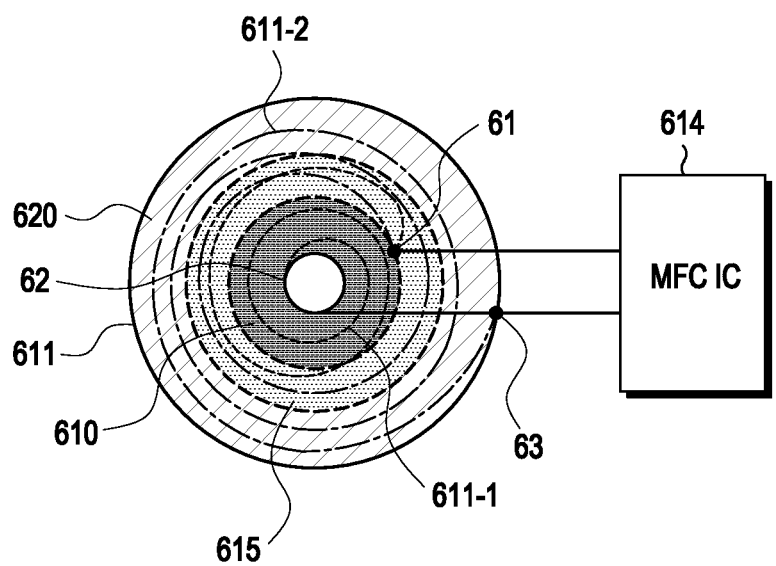
FIG. 6A is a view illustrating an example connection between a second parallel dual-coil antenna and an MFC IC according to an embodiment.

FIG. 6A is a view illustrating an example connection between a second parallel dual-coil antenna and an MFC IC according to an embodiment.

Referring to FIG. 6A, according to an embodiment, the second parallel dual-coil antenna 611 may be an antenna that includes an overlapping region 615 in which the coil-in region 610 and the coil-out region 620 overlap. According to an embodiment, the second parallel dual-coil antenna 611 may have branches such as the first coil 611-1 and the second coil 611-2, and a first point 61 is the boundary point between the coil-in region 610 and the overlapping region 615 (e.g., a point on the inner diameter of the second coil 611-2).

According to an embodiment, the first coil 611-1 may be wound to have a designated number of turns from the first point 61 to a second point 62 (e.g., the innermost point of the coil-in region 610) inside the coil-in region 610, and the second point 62 may be connected with the MFC IC 614. In doing so, the first coil 611-1 may traverse the boundary between the overlapping region 615 and the coil-in region 610.

According to an embodiment, the second coil 611-2 may be wound to have a designated number of turns from the first point 61 to a third point 63 (e.g., the outermost point of the coil-out region 620) at the boundary of the coil-out region 620, and the third point 63 may be connected with the MFC IC 614. According to an embodiment, in the second parallel dual-coil antenna 611, the first coil 611-1 and the second coil 611-2 partially overlap each other. Therefore, when the first coil 611-1 alone is used, the antenna region may be larger compared to the embodiment shown in FIG. 5. Further, since the directions of the magnetic fields radiated from the two overlapping coil regions are the same, they are not canceled out but act complementarily, enhancing efficiency and preserving the recognition distance characteristics as compared with the first parallel dual-coil antenna 511. For example, the second parallel dual-coil antenna 611 may enhance efficiency by about 5% to 6% as compared to the first parallel dual-coil antenna 511.

Figure 6B:
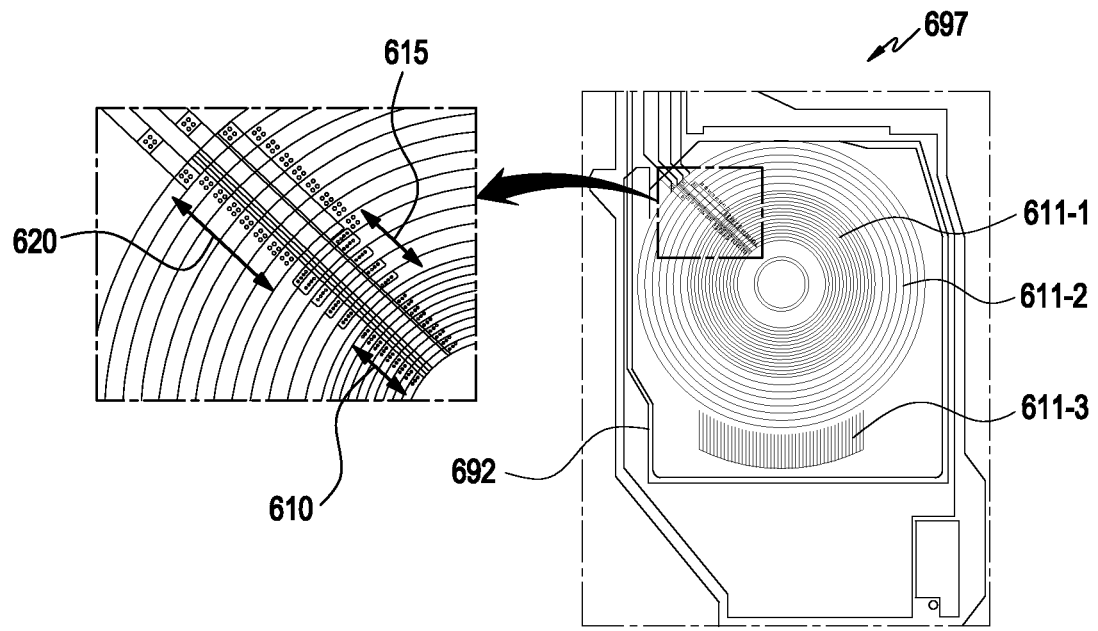
FIG. 6B is a view illustrating a multi-coil antenna including the second parallel dual-coil antenna according to an embodiment.
Figure 6C:
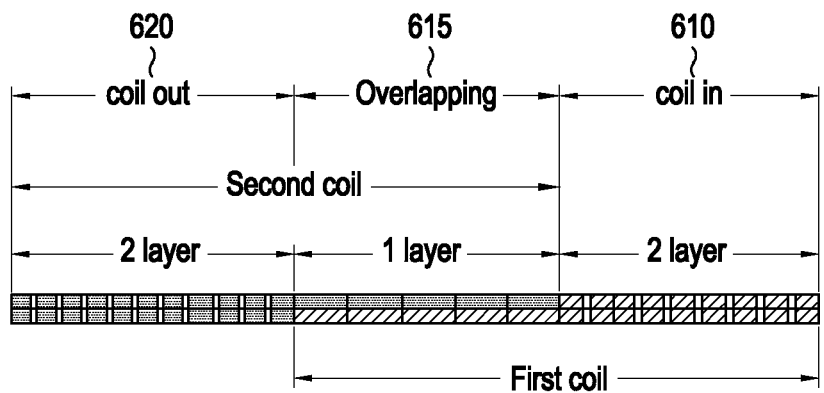
FIG. 6C is a cross-sectional view illustrating an overlapping region of a second parallel dual-coil antenna according to an embodiment.

FIG. 6B is a view illustrating a multi-coil antenna including the second parallel dual-coil antenna according to an embodiment. FIG. 6C is a cross-sectional view illustrating an overlapping region of a second parallel dual-coil antenna according to an embodiment.

Referring to FIG. 6B, according to an embodiment, the second parallel dual-coil antenna 611 may be included in the multi-coil antenna 697. The multi-coil antenna 697 may include a dielectric substrate 692 (e.g., a base layer) and may include the second parallel dual-coil antenna (or wireless power transmission/reception antenna) 611 and an MST antenna 611-3 on a first surface (e.g., an upper surface) of the dielectric substrate 692.

According to an embodiment, the second parallel dual-coil antenna 611 may be used to wirelessly transmit and receive power and may include at least one layer. According to an embodiment, the second parallel dual-coil antenna 611 may include a first coil 611-1 and a second coil 611-2. The first coil 611-1 may be disposed inside the second coil 611-2. The first coil 611-1 and the second coil 611-2 may partially overlap each other. According to an embodiment, the second parallel dual-coil antenna 611 may include a coil-in region 610 corresponding to the first coil 611-1, an overlapping region 615 corresponding to the overlapping region between the first coil 611-1 and the second coil 611-2, and a coil-out region 620 corresponding to the second coil 611-2. According to an embodiment, each of the first coil 611-1 and the second coil 611-2 may include two layers (double-sided layers).

Referring to FIG. 6C, according to an embodiment, the two layers of the first coil 611-1 may be disposed in the coil-in region 610. According to an embodiment, the two layers of the second coil 611-2 may be disposed in the coil-out region 620. According to an embodiment, one of the two layers of the first coil 611-1 and one of the two layers of the second coil 611-2 may overlap each other in the overlapping region 615.

Figure 7:
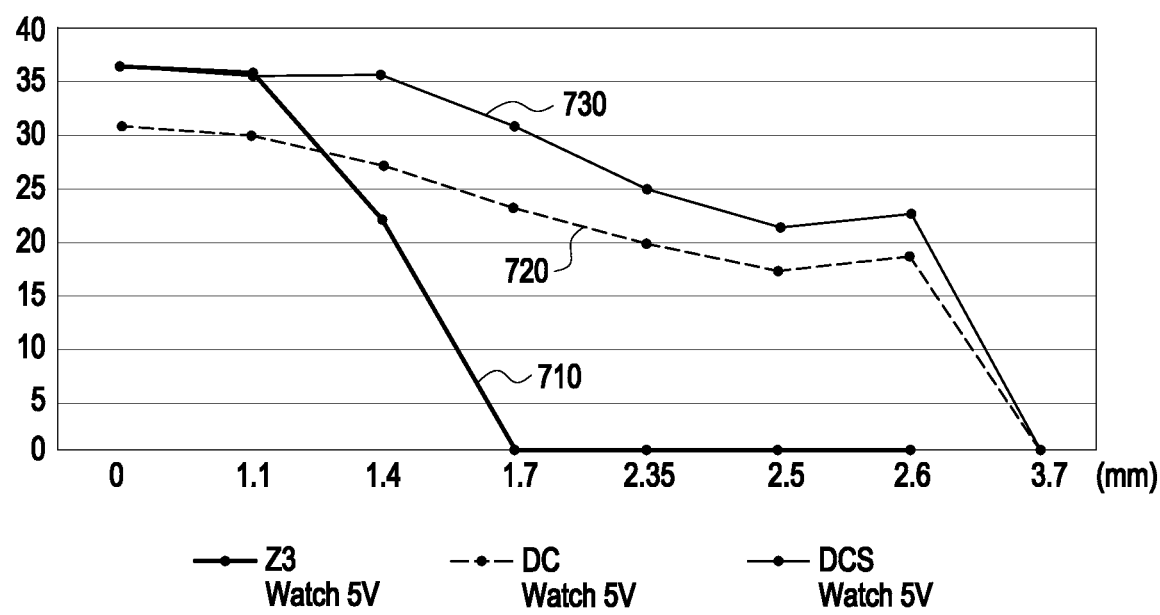
FIG. 7 is a graph illustrating efficiencies of a serial coil antenna, the first parallel dual-coil antenna, and the second parallel dual-coil antenna in an electronic device according to an embodiment.

FIG. 7 is a graph illustrating efficiencies of a serial coil antenna, the first parallel dual-coil antenna, and the second parallel dual-coil antenna in an electronic device according to an embodiment.

Referring to FIG. 7, in the graph 700 according to an embodiment, the horizontal axis may denote the type and thickness of the cover of each of the serial coil antenna (C, coil), a first parallel dual-coil antenna (DC, dual-coil) (e.g. the first parallel dual-coil antenna 511 of FIG. 5)), and a second parallel dual-coil antenna (DCS, dual-coil superposition) (e.g., the second parallel dual-coil antenna 611 of FIG. 6A). In the graph 700 according to an embodiment, the vertical axis may denote the efficiency when power is wirelessly transmitted (e.g., receive-side reception power/transmission power*100). According to an embodiment, reference numeral 710 may denote the efficiency curve according to the cover thickness (or recognition distance) of the serial coil antenna C. According to an embodiment, reference numeral 720 may denote the efficiency curve according to the cover thickness (or recognition distance) of the first parallel dual-coil antenna DC. According to an embodiment, reference numeral 730 may denote the efficiency curve according to the cover thickness (or recognition distance) of the second parallel dual-coil antenna DCS.

For example, the serial coil antenna C has good efficiency when the cover thickness is less than about 1.4 mm (e.g., Silicon Cover (about 1.4 mm)) but, when the thickness of the cover is about 1.4 mm or more, the efficiency may decrease rapidly. According to an embodiment, the efficiency of the first parallel dual-coil antenna DC and the second parallel dual-coil antenna DCS may not sharply decrease even when the thickness of the cover is about 1.4 mm or more.

According to an embodiment, compared to the serial coil antenna C, the first parallel dual-coil antenna DC may have an increased number of turns of the coils in the inner and outer regions and have lower resistance parallel characteristics, which may enhance the performance of coupling with the external electronic device and thus increase the recognition region (or distance).

According to an embodiment, the second parallel dual-coil antenna DCS may enhance wireless power transmission efficiency without deterioration of wireless power transmission/reception performance by allowing some regions of the first coil and the second coil to overlap so that the respective magnetic fields thereof cause constructive interference. According to an embodiment, the parallel dual-coil antenna (e.g., the first parallel dual-coil antenna 511 or the second parallel dual-coil antenna (e.g., 611)) may be included in the multi-coil antenna. According to an embodiment, the parallel dual-coil antenna may be packaged integrally with an MST antenna and included in the multi-coil antenna. For example, the MST antenna may include a coil antenna for MST or a conductive pattern antenna for MST.

Figure 8A:
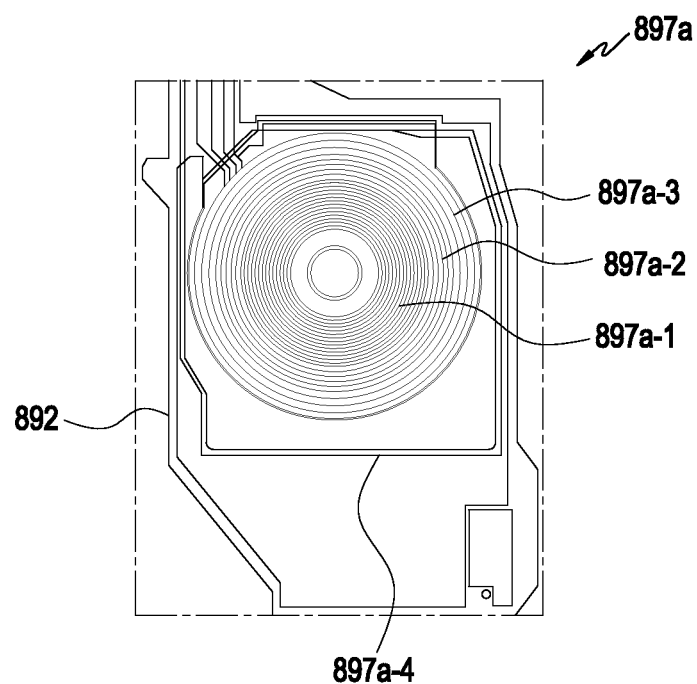
FIG. 8A is a view illustrating a first multi-coil antenna according to an embodiment.
Figure 8B:
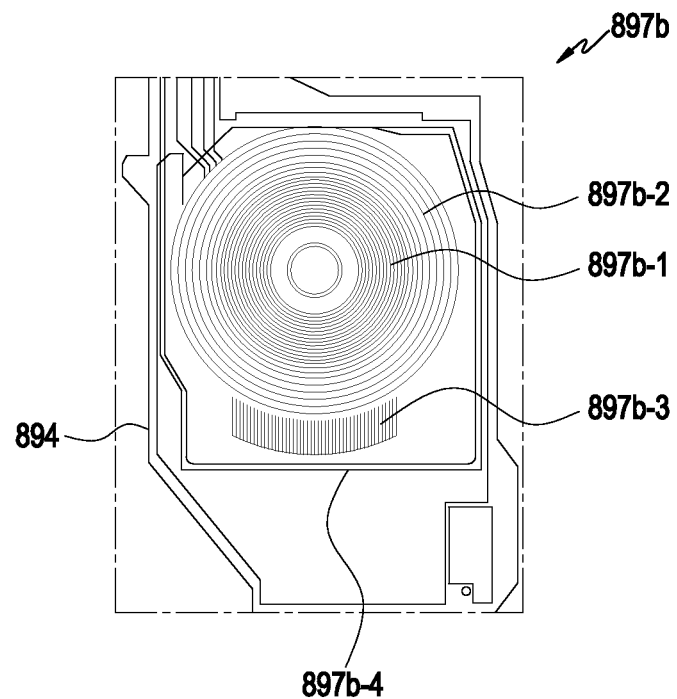
FIG. 8B is a view illustrating a second multi-coil antenna according to an embodiment.

FIG. 8A is a view illustrating a first multi-coil antenna according to an embodiment, and FIG. 8B is a view illustrating a second multi-coil antenna according to an embodiment.

Referring to FIG. 8A, according to an embodiment, a first multi-coil antenna 897a may include a dielectric substrate 892 (e.g., a base layer) and may include a parallel dual-coil antenna (or wireless power transmission/reception antenna) 897a-1 and 897a-2 and an MST antenna 897a-3 on a first surface (e.g., an upper surface) of the dielectric substrate 892.

According to an embodiment, the wireless power transmission/reception antenna 897a-1 and 897a-2 may be used to wirelessly transmit and receive power and may include at least one layer. According to an embodiment, the wireless power transmission/reception antenna 897a-1 and 897a-2 may include a first coil 897a-1 and a second coil 897a-2 that may be connected in series or in parallel using a switch (not shown). The first coil 897a-1 may be disposed inside the second coil 897a-2. The first coil 897a-1 and the second coil 897a-2 may have different coil widths.

According to an embodiment, the MST antenna 897a-3 may be disposed to surround the second coil 897a-2. The MST antenna 897a-3 may be used for payment by an electronic device (e.g., the electronic device 101 of FIG. 1 or the electronic device 901 of FIG. 9). The MST antenna 897a-3 may include, e.g., a coil wound several times (e.g., about two times) outside the second coil 897a-2.

According to an embodiment, an NFC antenna 897a-4 may be formed on at least a portion (e.g., an intermediate portion or/and an upper portion) of the dielectric substrate 892. The NFC antenna 897a-4 may be used for short-range communication by the electronic device (e.g., the electronic device 101 of FIG. 1 or the electronic device 301 of FIG. 3). The inductance value of the NFC antenna 897a-4 may be, e.g., less than about 1 uH. The NFC antenna 897a-4 may be formed to surround the wireless power transmission/reception antenna 897a-1 and 897a-2 (e.g. outside the wireless power transmission/reception antenna 897a-1 and 897a-2). According to an embodiment, the first multi-coil antenna 897a may not include the NFC antenna 897a-4. According to an embodiment, the MST antenna 897a-3 may be replaced with the NFC antenna 897a-4.

Referring to FIG. 8B, according to an embodiment, a second multi-coil antenna 897b may include a dielectric substrate 894 (e.g., a base layer) and may include a parallel dual-coil antenna (or wireless power transmission/reception antenna) 897b-1 and 897b-2 and an MST antenna 897b-3 on a first surface (e.g., an upper surface) of the dielectric substrate 894.

According to an embodiment, the wireless power transmission/reception antenna 897b-1 and 897b-2 may be used to wirelessly transmit and receive power and may include at least one layer. According to an embodiment, the wireless power transmission/reception antenna 897b-1 and 897b-2 may include a first coil 897b-1 and a second coil 897b-2 that may be connected in series or in parallel using a switch (not shown). The first coil 897b-1 may be disposed inside the second coil 897b-2. The first coil 897b-1 and the second coil 897b-2 may have different coil widths.

According to an embodiment, the MST antenna 897b-3 may be disposed in the form of a resistive pattern (e.g., a meander pattern) under the wireless power transmission/reception antenna 897b-1 and 897b-2. The MST antenna 897b-3 may be used for payment by an electronic device (e.g., the electronic device 101 of FIG. 1 or the electronic device 901 of FIG. 9).

According to an embodiment, an NFC antenna 897b-4 may be formed on at least a portion (e.g., a middle portion or/and an upper portion) of the dielectric substrate 894. The NFC antenna 897b-4 may be used for short-range communication by the electronic device (e.g., the electronic device 101 of FIG. 1 or the electronic device 301 of FIG. 3). The inductance value of the NFC antenna 897b-4 may be, e.g., less than about 1 uH. The NFC antenna 897b-4 may be formed to surround the wireless power transmission/reception antenna 897b-1 and 897b-2 (e.g. outside the wireless power transmission/reception antenna 897b-1 and 897b-2). According to an embodiment, the second multi-coil antenna 897b may not include the NFC antenna 897b-4. According to an embodiment, the MST antenna 897b-3 may be replaced with the NFC antenna 897b-4.

According to an embodiment, a multi-coil antenna comprises a dielectric substrate, a first coil disposed in a first region on the dielectric substrate, a second coil disposed in a second region surrounding the first region, on the dielectric substrate, and a capacitor. The first coil and the second coil are connected in parallel and have a designated number of turns for wirelessly transmitting power. The capacitor has a designated capacitance associated with an inductance and resistance for wirelessly transmitting power through the first coil and the second coil connected in parallel.

According to an embodiment, the multi-coil antenna may include an overlapping region between the first region and the second region.

According to an embodiment, two layers of the first coil may be disposed in the first region, two layers of the second coil may be disposed in the second region, and one layer of the first coil and one layer of the second coil may be disposed in the overlapping region.

Figure 9:
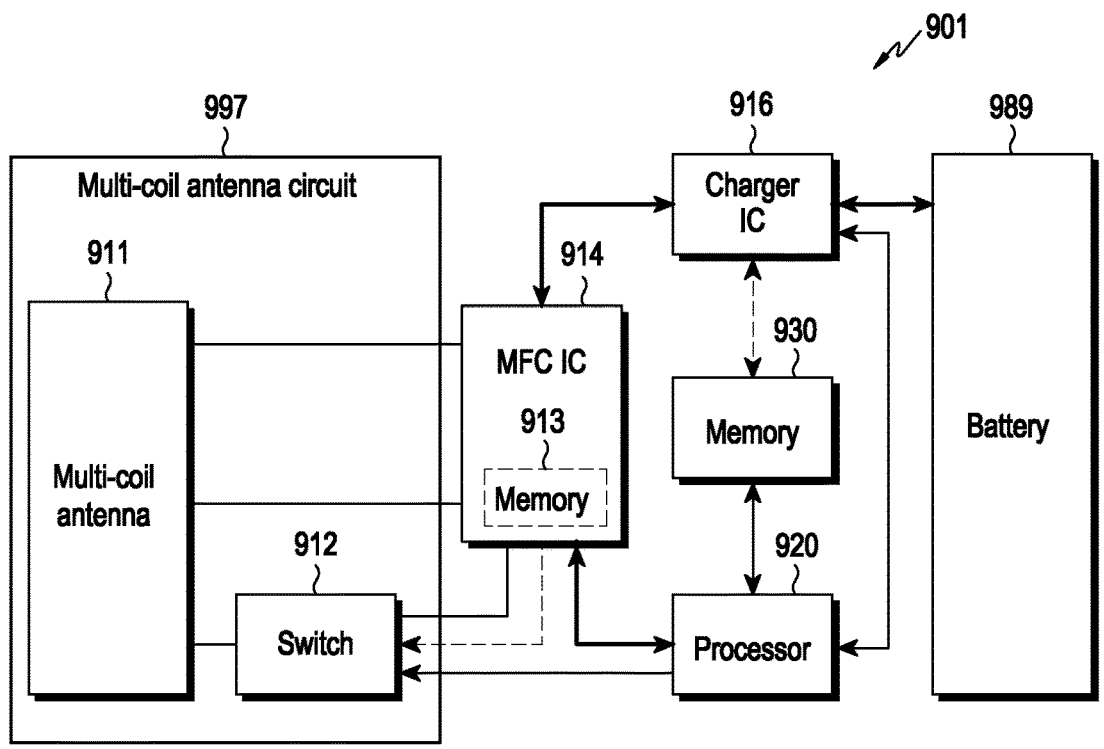
FIG. 9 is a block diagram illustrating an electronic device including a multi-coil antenna circuit according to an embodiment.

FIG. 9 is a block diagram illustrating an electronic device including a multi-coil antenna circuit according to an embodiment.

Referring to FIG. 9, according to an embodiment, an electronic device 901 (or a second electronic device) (e.g., the electronic device 101 of FIG. 1) may include all or some of a multi-coil antenna circuit 997 (e.g., the antenna module 197 of FIG. 1), a magnetic field controller integrated circuit (MFC IC) 914, a charger IC 916, a processor 920 (e.g., the processor 120 of FIG. 1)), a memory 930 (e.g., the memory 130 of FIG. 1), and a battery 989 (e.g., the battery 189 of FIG. 1).

According to an embodiment, the multi-coil antenna circuit 997 may include a multi-coil antenna 911 and a switch (or switch circuit) 912. According to an embodiment, the multi-coil antenna 911 may include a plurality of coils (or a plurality of conductive members). For example, the multi-coil antenna 911 is an antenna having a plurality of coils (or a plurality of conductive members) integrally packaged (e.g., the multi-coil antenna 697 of FIG. 6B, the first multi-coil antenna 897a of FIG. 8A, or the multi-coil antenna 897b of FIG. 8B).

According to an embodiment, the plurality of coils may include a first coil (e.g., the first coil 511-1 of FIG. 5, the first coil 611-1 of FIG. 6A, the first coil 897a-1 of FIG. 8A, or the first coil 897b-1 of FIG. 8B) and a second coil (e.g., the second coil 611-2 of FIG. 5, the second coil 611-2 of FIG. 6A, the second coil 897a-2 of FIG. 8A, or the second coil 897b-2 of FIG. 8B), or the plurality of may include a first coil, a second coil, and a third coil (or a third conductive pattern) (e.g., the third coil 897a-3 of FIG. 8A or the third coil 897b-3 of FIG. 8B). The first coil and the second coil may be used for wireless power transmission/reception (e.g., NFMI). According to an embodiment, the first coil may be included at an inside (Coil_IN) of the multi-coil antenna 911, and the second coil may be included at an outside (Coil_OUT) of the first coil. For example, the first coil may be connected to the MFC IC 914, and the second coil may be connected to the first coil. According to an embodiment, the third coil (or third conductive pattern) may be used for a purpose other than wireless power transmission/reception, e.g., magnetic secure transmission (e.g., MST or NFC). According to an embodiment, when the multi-coil antenna 911 includes a first coil, a second coil, and a third coil (or a third conductive pattern), the first coil may be disposed at an inside (Coil_IN) of the multi-coil antenna 911, the second coil may be disposed at an outside (Coil_OUT) of the first coil, and the third coil (or a third conductive pattern) may be disposed outside of the second coil.

According to an embodiment, the switch 912 may include at least one switch and may be connected between the antenna circuit 997 and the MFC IC 914. Each of the at least one switch of the switch 912 may turn on or off based on the control of the processor 920. For example, some (e.g., the third coil) of the plurality of coils of the multi-coil antenna 911 may be connected to the MFC IC 914 or some (e.g., the first coil and the second coil) of the plurality of coils may be connected in parallel with each other and connected to the MFC IC 914, or some (e.g., the first coil and the second coil) of the plurality of coils may be connected in series with each other and connected to the MFC IC 914 based on the switching on or off of at least one switch. According to an embodiment, the switch 912 may include a first switch, or the switch 912 may include a first switch and a second switch. According to an embodiment, the first switch may be disposed between the first coil and the second coil, and may switch on or off under the control of the processor 920. According to an embodiment, the first switch may switch off to allow the first coil to connect to the MFC IC 914, and the first switch may switch on to allow the first coil and the second coil to connect to each other in parallel and connect to the MFC IC 914. According to an embodiment, the second switch may be disposed between the third coil and the MFC IC 914, and may switch on or off under the control of the processor 920. According to an embodiment, the second switch may switch on to allow the third coil to connect to the MFC IC 914, and the second switch may switch off to prevent the third coil (or third conductive pattern) from connecting to the MFC IC 914.

According to an embodiment of the disclosure, the MFC IC 914 may be connected to some or all of the plurality of coils based on the switching on or off of at least one switch included in the switch 912. According to an embodiment, the MFC IC 914 may be connected to some (e.g., the third coil) of the plurality of coils of the antenna circuit 997, to coils (e.g., the first coil and second coil connected in parallel) connected in parallel among the plurality of coils, or to coils (e.g., the first coil and second coil connected in series) connected in series among the plurality of coils, based on the switching on or off of at least one switch 912. According to an embodiment, the MFC IC 914 may perform wireless power reception operation, wireless power transmission operation, or MST operation (or an NFC operation) through the connections thereto using the plurality of coils of the antenna circuit 997. According to an embodiment, the MFC IC 914 may include a wireless power reception circuit (not shown) for wireless power reception, a wireless power transmission circuit (not shown) for wireless power transmission, and an MST circuit (not shown) (or an NFC circuit). For example, when receiving wireless power, the wireless power reception circuit may perform power processing, such as rectifying the AC waveform of power received through the connected coil among the plurality of coils into a DC waveform, converting voltage, or regulating power, and transfer the same to the charger IC 916. For example, upon transmitting wireless power, the wireless power transmission circuit may receive power from the charger IC 916, generate an AC waveform for power transmission, and generate a magnetic field through the connected coil among the plurality of coils based on the generated AC waveform to allow wireless power to be transmitted through the magnetic field. For example, the MST circuit may transmit and receive MST signals through the connected coil among the plurality of coils.

According to an embodiment of the disclosure, the charger IC 916 may be connected between the MFC IC 914 and the battery 989. According to an embodiment, the charger IC 916 may charge the battery 989 using the power received through the MFC IC 914 and provide the power from the battery 989 to the MFC IC 914. The MFC IC 914 may generate a magnetic field at the antenna circuit 997 using the provided power to allow the power to be wirelessly transmitted to an external electronic device. For example, it is possible to allow the power from the battery 989 to be wirelessly shared with the external electronic device. According to an embodiment, the external electronic device may be one of various types of external electronic devices. For example, various types of external electronic device may include a first external electronic device (e.g., a smartphone) that requires the reception of first power based on a first distance (or first center alignment accuracy) from the second electronic device 901 and a second external electronic device (e.g., an accessory device or smart watch that may interwork with the second electronic device 901) that requires the reception of second power based on a second distance shorter than the first distance (or a second center alignment accuracy higher than the first center alignment accuracy).

According to an embodiment, the processor 920 (e.g., the processor 120 of FIG. 1) may control the switch 912 based on the operation states (or operation modes) associated with the multi-coil antenna circuit 997 of the second electronic device 901. According to an embodiment, the operation modes associated with the multi-coil antenna circuit 997 may include a first mode, a second mode, or/and a third mode. According to an embodiment, the first mode may be a first wireless power transmission mode for wirelessly transmitting power to a first external electronic device using the multi-coil antenna circuit 997 and a wireless power reception mode for wirelessly receiving power from an external device (e.g., the first external electronic device or a second external electronic device) using the multi-coil antenna circuit 997. For example, the first mode may be the default mode. According to an embodiment, the second mode may include a second wireless power transmission mode for wirelessly transmitting power to the second external electronic device. According to an embodiment, the third mode may include an MST mode for performing an MST function using the multi-coil antenna circuit 997. For example, the first external electronic device may be an electronic device (e.g., a smartphone) that requires the reception of first power based on a first distance (or first center alignment accuracy) from the electronic device 901, and the second external electronic device may be an electronic device (e.g., an accessory device or smart watch that may interwork with the second electronic device 901) that requires the reception of second power based on a second distance shorter than the first distance (or a second center alignment accuracy higher than the first center alignment accuracy).

According to an embodiment, the processor 920 may control the switching on/off of the first switch and/or the second switch included in the switch 912 based on the operation mode (or operation state) associated with the multi-coil antenna circuit 997.

For example, when the multi-coil antenna circuit 997 includes a first coil and a second coil, and the switch 912 includes a first switch, the processor 920 may control the first switch to switch on to thereby connect the first coil and the second coil in parallel, allow the first coil and the second coil, which are connected in parallel, to connect to the MFC IC 214 in the first mode. Conversely, in the second mode, the processor 920 may control the first switch to switch off to thereby connect the first coil to the MFC IC 214.

For example, when the antenna circuit 997 includes a first coil, a second coil, and a third coil (or resistive pattern), and the switch 912 includes a first switch and a second switch, the processor 920 may control the second switch to switch off and the first switch to switch on to thereby connect the first coil and the second coil in parallel and allow the first coil and the second coil, which are connected in parallel, to connect to the MFC IC 914 in the first mode. Conversely, in the second mode, the processor 920 may control the second switch to switch off and the first switch to switch off to thereby connect the first coil to the MFC IC 914. In the third mode, the processor 920 may control the second switch to switch on and the first switch to switch off to thereby connect the first coil, the second coil, and the third coil in series and allow the first coil, the second coil, and the third coil, which are connected in series, to connect to the MFC IC 914.

According to an embodiment, the memory 930 (e.g., the memory 130 of FIG. 1) may store various control data and/or data tables used by at least one component (e.g., the processor 920 or the MFC IC 914) of the electronic device 901. For example, the memory 930 may store tables corresponding to Tables 1 to 5 to be described below. Control data or/and data tables used by the MFC IC 914 may be stored in the memory 913 included in the MFC IC 914. According to an embodiment, the memory 930 may store instructions to perform the operation of the electronic device 901. According to an embodiment, the memory 930 may be implemented in various forms, such as read only memory (ROM), random access memory (RAM), or flash memory, and is not limited to a specific implementation.

Figure 10:
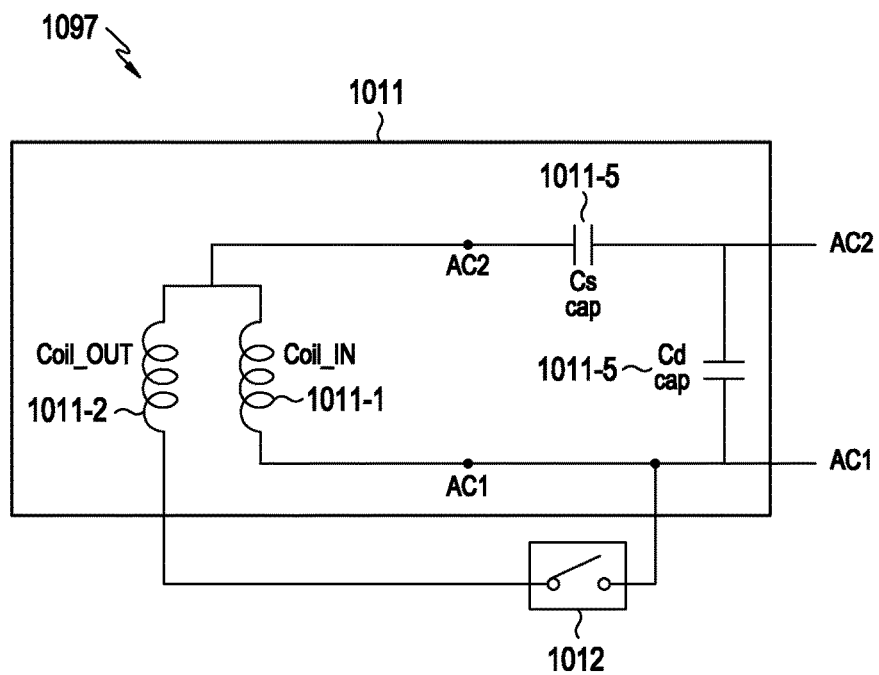
FIG. 10 is a view illustrating an example of a first multi-coil antenna circuit representing a case where a multi-coil antenna circuit includes a first coil, a second coil, and a first switch according to an embodiment.

FIG. 10 is a view illustrating an example of a first multi-coil antenna circuit representing a case where a multi-coil antenna circuit includes a first coil, a second coil, and a first switch according to an embodiment.

Referring to FIG. 10, according to an embodiment, a first multi-coil antenna circuit 1097 may include a multi-coil antenna 1011 that includes a first coil 1011-1, a second coil 1011-2, and capacitors 1011-5, and a first switch 1012.

According to an embodiment, the multi-coil antenna 1011 may have the first coil 1011-1, the second coil 1011-2, and the capacitor 1011-5 integrally packaged. According to an embodiment, the first coil 1011-1 and the second coil 1011-2 may be coils for wireless power transmission/reception (e.g., NFMI). According to an embodiment, the first coil 1011-1 is included at an inside (Coil_IN) of the multi-coil antenna 1011, and the second coil 1011-2 may be included at an outside (Coil_OUT) of the first coil 1011-1). For example, the first coil 1011-1 may be connected to an external MFC IC (e.g., 914 of FIG. 9), and the second coil 1011-2 may be connected to the first coil 1011-1. According to an embodiment, the first coil 1011-1 may have a length (or number of turns) suitable for wireless transmission of first power to a second external electronic device using the first coil 1011-1. According to an embodiment, the second coil 1011-2 may have a length (or number of turns) suitable for wireless transmission of second power to a first external electronic device using the first coil 1011-1 and the second coil 1011-2 connected in parallel with each other.

According to an embodiment, the capacitors (Cs cap and Cd cap) 1011-5 may have a capacitance necessary to allow the first multi-coil antenna circuit 1097 to maintain a designated inductance and resistance when wirelessly transmitting the first power to the second external electronic device through the first coil 1011-1 or to wirelessly transmit the second power to the first external electronic device through the first coil 1011-1 and the second coil 1011-2 connected in parallel.

According to an embodiment, the first switch 1012 may have an end connected to the first coil 1011-1 and the MFC IC (e.g., the MFC IC 914 in FIG. 9) and another connected to the second coil 1011-2. According to an embodiment, the first switch 1012 may switch on or off according to the control based on the operation mode (first mode or second mode) of a processor (e.g., the processor 120 of FIG. 1 or the processor 920 of FIG. 9). According to an embodiment, in the first mode, the first switch 1012 may switch on to connect the first coil 1011-1 and the second coil 1011-2 in parallel and to allow the first coil 1011-1 and the second coil 1011-2 connected in parallel to connect to the MFC IC 914.

According to an embodiment, the first switch 1012 may switch off to connect the first coil 1011-1 to the MFC IC 914.

According to an embodiment, the first multi-coil antenna circuit 1097 may perform wireless power reception operation or first wireless power transmission operation in the first mode and second wireless power transmission operation in the second mode.

TABLE 1

|  |  | First switch | Mode |
|---|---|---|---|
| RX mode |  | ○ | first mode |
| TX mode | Ping | ○ |  |
|  | P2P | ○ |  |
|  | P2G | X | second mode |

Table 1 above is a table representing an example of switching on and off of the first switch 1012 based on the operation mode of the electronic device in the first multi-coil antenna circuit 1011 according to an embodiment. Referring to Table 1, the processor (e.g., the processor 120 of FIG. 1 or the processor 920 of FIG. 9) or the MFC IC 914 may control the first switch 1012 to switch on in the first mode and, in the second mode, control the first switch 1012 to switch off. According to an embodiment, the first mode may include a power reception mode (RX mode) and a first power transmission mode (Ping or P2P). For example, the power reception mode may be a state (or mode) in which the second electronic device 901 receives power. According to an embodiment, the first power transmission mode may be a mode in which the electronic device 901 transmits the first power to the first external electronic device. For example, Ping may be a state in which the electronic device 901 transmits a Ping signal to transmit the first power to the first external electronic device, and P2P (phone to phone) may be a state in which the second electronic device 901 (e.g., a phone) transmits the first power to the first external electronic device (e.g., a phone).

According to an embodiment, the second mode may be a mode in which the electronic device 901 transmits the second power to the second external electronic device. For example, P2G (phone to gear) may be a state in which the second electronic device 901 (e.g., a phone) transmits the second power to the second external electronic device (e.g., a watch).

Figure 11:
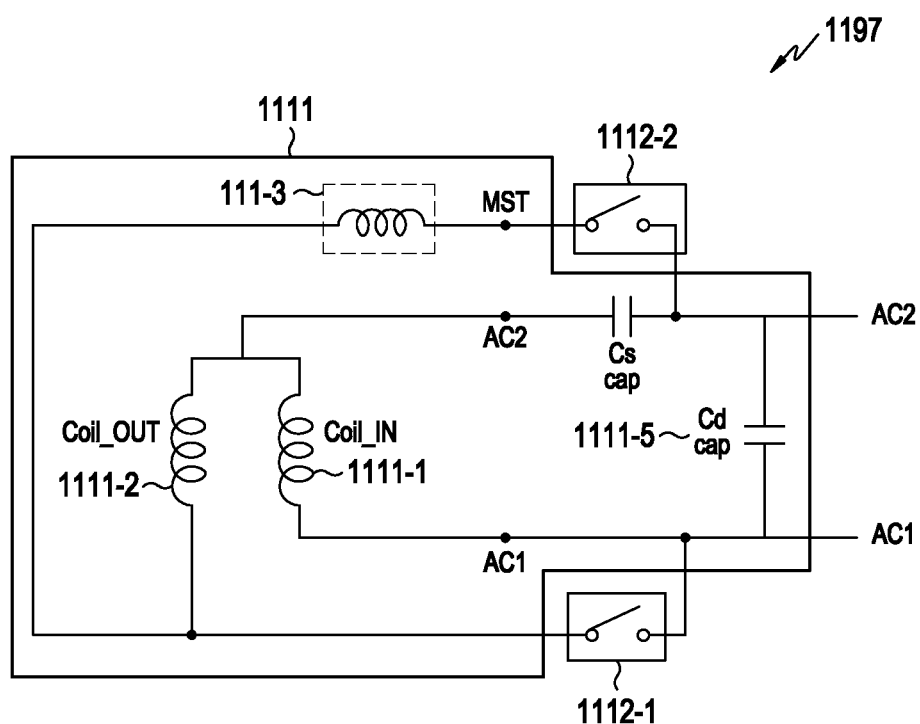
FIG. 11 is a view illustrating an example of a second multi-coil antenna circuit representing a case where a multi-coil antenna circuit includes a first coil, a second coil, a third coil, a first switch, and a second switch according to an embodiment.

FIG. 11 is a view illustrating an example of a second multi-coil antenna circuit representing a case where a multi-coil antenna circuit includes a first coil, a second coil, a third coil, a first switch, and a second switch according to an embodiment.

Referring to FIG. 11, according to an embodiment, a second multi-coil antenna circuit 1197 (e.g., the antenna module 197 of FIG. 1 or the multi-coil antenna circuit 997 of FIG. 9) may include a multi-coil antenna 1111 that includes a first coil 1111-1, a second coil 1111-2, a third coil 1111-3, and at least one capacitor (e.g., Cs cap and Cd cap) 1111-5, a first switch 1112-1, and a second switch 1112-2.

According to an embodiment, the multi-coil antenna 1111 may have the first coil 1111-1, the second coil 1111-2, and the third coil 1111-3 packaged. According to an embodiment, the first coil 1111-1 and the second coil 1111-2 may be coils used for wireless power transmission/reception (e.g., NFMI), and the third coil 1111-3 may be a coil used for MST. According to an embodiment, the multi-coil antenna 1111 may include a conductive pattern (e.g., a third conductive pattern, a pattern resistor, or a meander-type resistor) instead of the third coil 1111-3, which may be used for MST.

According to an embodiment, the first coil 1111-1 may be included at an inside (Coil_IN) of the multi-coil antenna 1111, and a second coil 1111-2 may be disposed at an outside (Coil_OUT) of the first coil 1111-1. The third coil 1111-3 may be disposed outside the second coil 1111-2. For example, the first coil 1111-1 may be connected to the MFC IC 914, the second coil 1111-2 may be connected to the first coil 111-1, and the third coil 1111-3 may be connected to the second coil 1111-2.

According to an embodiment, the first coil 1111-1 may have a length (or number of turns) suitable for wireless transmission of second power to a second external electronic device using the first coil 1111-1. According to an embodiment, the second coil 1111-2 may have a length (or number of turns) suitable for wireless transmission of first power to a first external electronic device using the first coil 1111-1 and the second coil 1111-2 connected in parallel with each other. According to an embodiment, the third coil 1111-3 may have a length (or number of turns) suitable for MST operations using the first coil 1111-1, the second coil 1111-2, and the third coil 1111-3 connected in series.

According to an embodiment, the at least one capacitor (e.g., Cs cap and Cd cap) 1111-5 may have a capacitance necessary to allow the second multi-coil antenna circuit 1197 to maintain a designated inductance and resistance when wirelessly transmitting the second power to the second external electronic device through the first coil 1111-1 or wirelessly transmitting the first power to the first external electronic device through the first coil 1111-1 and the second coil 1111-2 connected in parallel.

According to an embodiment, the first switch 1112-1 may have an end connected to the first coil 1111-1 and AC1 (e.g., AC1 of the MFC IC 914 of FIG. 9) and another end of the second coil 1111-2. According to an embodiment, the second switch 1112-2 may have an end connected to AC2 (e.g., AC2 of the MFC IC 914 of FIG. 9) and another end connected to the third coil 1111-3.

According to an embodiment, the first switch 1112-1 and the second switch 1112-2 may switch on or off according to the control based on the operation mode (first mode, second mode, or third mode) of a processor (e.g., the processor 120 of FIG. 1 or the processor 920 of FIG. 9). According to an embodiment, the first switch 1112-1 may switch on and the second switch 1112-2 may switch off according to the first mode-based control. According to an embodiment, the first switch 1112-1 and the second switch 1112-2 may switch off according to the second mode-based control. According to an embodiment, the first switch 1112-1 may switch off and the second switch 1112-2 may switch on according to the third mode-based control. For example, when the first switch 1112-1 switches on and the second switch 1112-2 switches off in the first mode, the first coil 1111-1 and the second coil 1111-2 may be connected in parallel, and the first coil 1111-1 and the second coil 1111-2 connected in parallel may be connected to the MFC IC 914 while the third coil 1111-3 may not be connected to the MFC IC 914. For example, when the first switch 1112-1 and the second switch 1112-2 switch off in the second mode, the first coil 1111-1 may be connected to the MFC IC 914 while the third coil 1111-3 may not be connected to the MFC IC 914. For example, when the first switch 1112-1 switches off and the second switch 1112-2 switches on in the third mode, the first coil 1111-1, the second coil 1111-2, and the third coil 1111-3 may be connected in series, and the first coil 1111-1, the second coil 1111-2, and the third coil 1111-3 connected in series may be connected to the MFC IC 914.

According to an embodiment, the second multi-coil antenna circuit 1197 may perform wireless power reception operation or first wireless power transmission operation in the first mode, second wireless power transmission operation in the second mode, and MST operation in the third mode.

For example, as the first coil 1111-1 and the second coil 1111-2 are connected in parallel and operate in the first mode, although the length (or number of turns) of the first coil 1111-1 and/or the second coil 1111-2 increases due to their being in parallel, the resistance and inductance may be managed as the sum for the parallel connection so that the designated inductance and resistance may be maintained. Accordingly, the length (or number of turns) of the first coil 1111-1 or/and the second coil 1111-2 may be increased. Further, as the length (or number of turns) of the first coil 1111-1 is increased, the power transmission may be performed by the first coil 1111-1 alone. Therefore, in the second mode, power may be transmitted using the first coil 1111-1. Since the first coil 1111-1, the second coil 1111-2, and the third coil 1111-3 may be connected in series and used in the third mode, the length (or number of turns) for MST may be reduced, thereby decreasing the area where the coils are placed and hence allowing the space to be used more efficiently.

For example, in the first mode, upon receiving wireless power, the MFC IC 914 may perform power processing, such as rectifying the AC waveform of power received through the first coil 1111-1 and the second coil 1111-2 connected in parallel into a DC waveform, converting the voltage, or regulating the power, and transfer the same to the charger IC (e.g., the charger IC 916). For example, in a first wireless power transmission operation, the MFC IC 914 may receive power from the charger IC 916, generate an AC waveform for power transmission, and generate a magnetic field through the first coil 1111-1 and the second coil 1111-2 connected in parallel based on the generated AC waveform to allow the first power to be wirelessly transmitted through the magnetic field.

For example, in the second mode, the MFC IC 914 may receive power from the charger IC 916 in a second wireless power transmission operation, generate an AC waveform for power transmission, and generate a magnetic field through the first coil 1111-1 based on the generated AC waveform, allowing the second power to be wirelessly transmitted to the second external electronic device through the magnetic field.

For example, in the third mode, the MFC IC 914 may wirelessly transmit magnetic credit card information in the electronic device 901 through the first coil 1111-1, the second coil 1111-2, and the third coil 1111-3 connected in series in an MST operation, allowing the same to be used for payment. According to an embodiment, a third conductive pattern (e.g., a pattern resistor or meander pattern resistor) may be used instead of the third coil 1111-3.

TABLE 2

| | | First switch | Second switch | Mode |
|---|---|---|---|---|
| RX mode | | ○ | X | first mode |
| TX mode | Ping | ○ | X | |
| | P2P | ○ | X | |
| | P2G | X | X | second mode |
| MST mode | | X | ○ | third mode |

Table 2 above is a table representing examples of switching on and off of the first switch 1112-1 and the second switch 1112-2 based on the operation mode of the electronic device using the second multi-coil antenna circuit 1197 according to an embodiment. Referring to Table 2, a processor (e.g., the processor 120 of FIG. 1 or the processor 920 or MFC IC 914 of FIG. 9) may control the first switch 1112-1 to switch on and the second switch 1112-2 to switch off in the first mode, control the first switch 1112-1 and the second switch 1112-2 to switch off in the second mode, and control the first switch 1112-1 to switch off and the second switch 1112-2 to switch on in the third mode. According to an embodiment, the first mode may include a power reception mode (RX mode) and a first power transmission mode (Ping or P2P). For example, the power reception mode may be a state (or mode) in which the second electronic device 901 receives power from an external electronic device. According to an embodiment, the first power transmission mode may be a mode in which the electronic device 901 transmits the first power to the first external electronic device. For example, Ping may be a state in which the electronic device 901 transmits a Ping signal to transmit the first power to the first external electronic device, and P2P (phone to phone) may be a state in which the electronic device 901 (e.g., a phone) transmits the first power to the first external electronic device (e.g., a phone).

According to an embodiment, the second mode may be a mode in which the electronic device 901 transmits the second power to the second external electronic device. For example, P2G (phone to gear) may be a state in which the electronic device 901 (e.g., a phone) transmits the second power to the second external electronic device (e.g., a watch).

According to an embodiment, the third mode may be an MST mode. For example, the MST mode may be a state in which magnetic credit card information in the electronic device 901 is wirelessly transmitted to an outside to be used for payment.

Figure 12A:
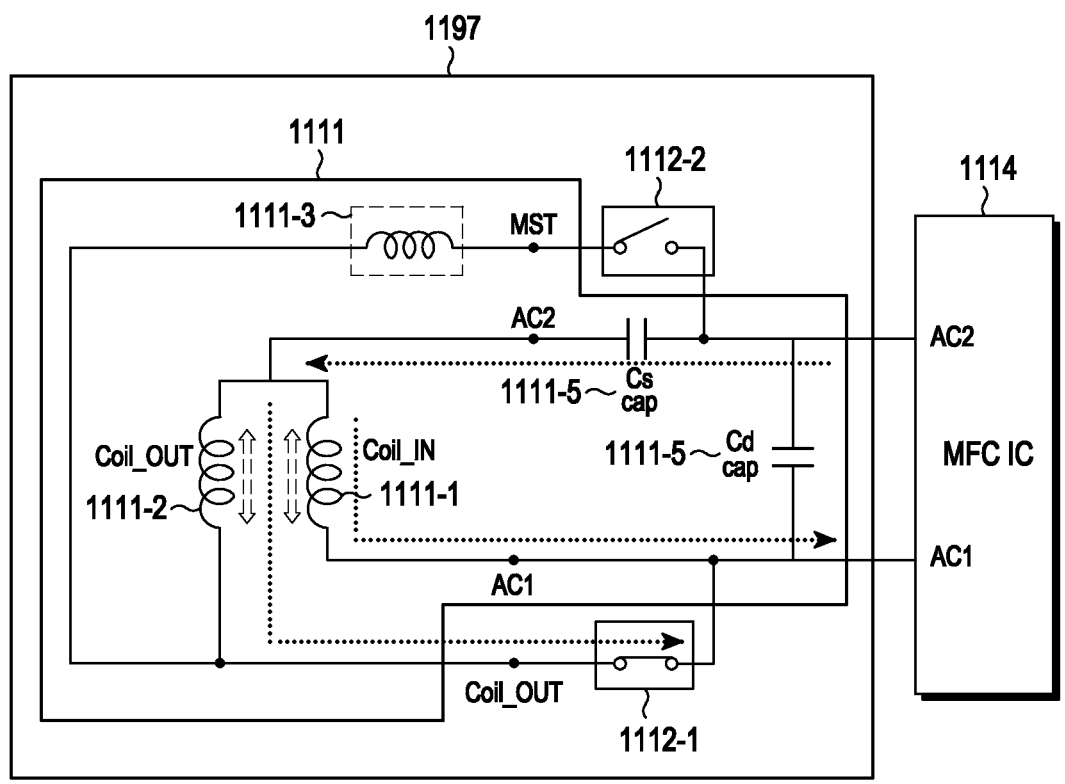
FIG. 12A is a view illustrating operations of a second multi-coil antenna circuit in a first mode according to an embodiment.
Figure 12B:
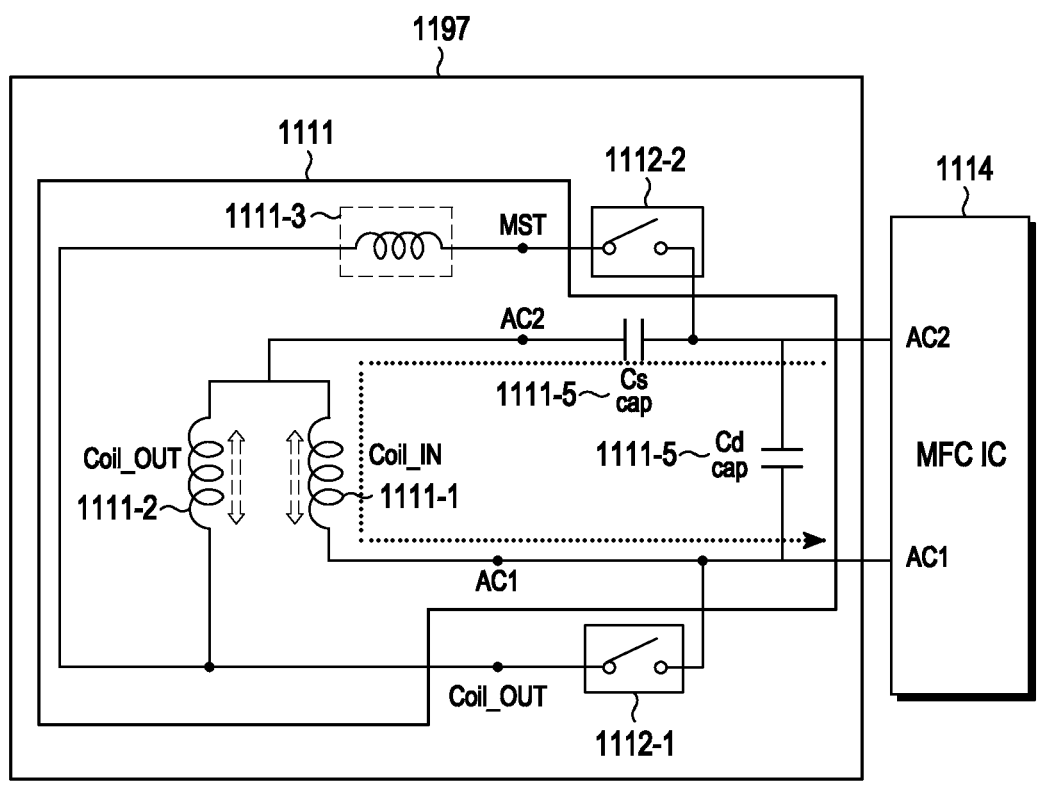
FIG. 12B is a view illustrating operations of a second multi-coil antenna circuit in a second mode according to an embodiment.
Figure 12C:
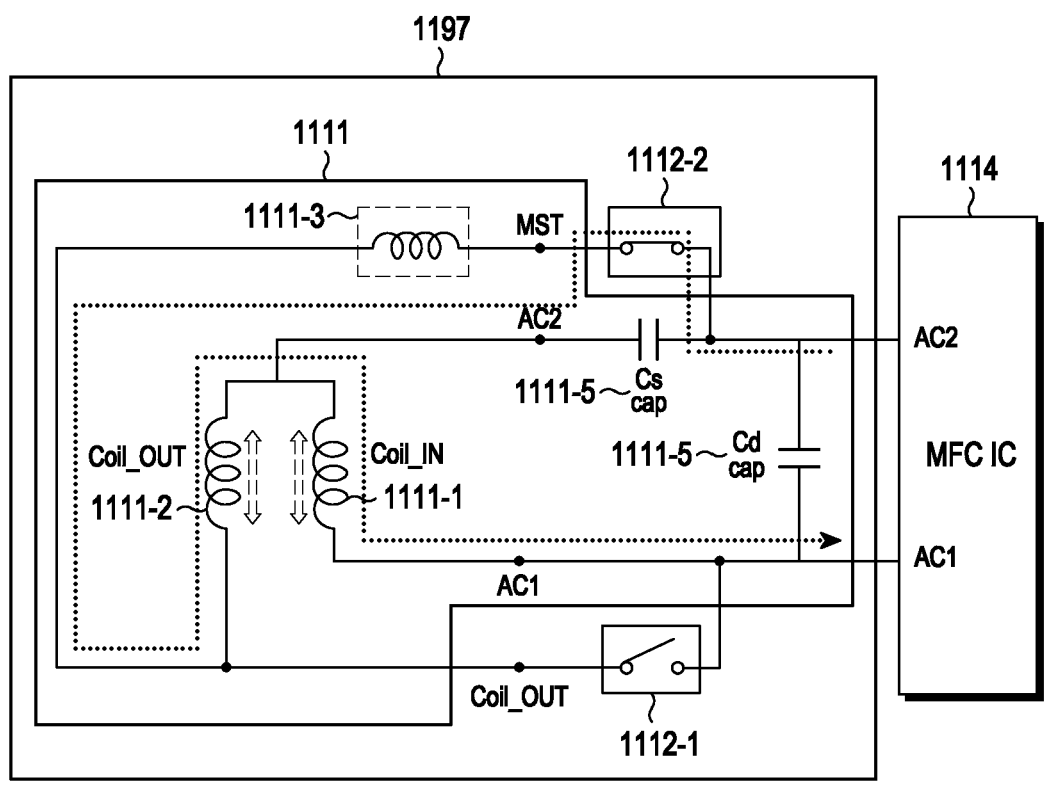
FIG. 12C is a view illustrating operations of a second multi-coil antenna circuit in a third mode according to an embodiment.

FIG. 12A is a view illustrating operations of a second multi-coil antenna circuit in a first mode according to an embodiment. FIG. 12B is a view illustrating operations of a second multi-coil antenna circuit in a second mode according to an embodiment. FIG. 12C is a view illustrating operations of a second multi-coil antenna circuit in a third mode according to an embodiment.

Referring to FIG. 12A, according to an embodiment, in the first mode, the first switch 1112-1 of the second multi-coil antenna circuit 1197 may switch on and the second switch 1112-2 may switch off. As the first switch 1112-1 switches on and the second switch 1112-2 switches off, the first coil 1111-1 and the second coil 1111-2 may be connected in parallel, and the first coil 1111-1 and the second coil 1111-2 connected in parallel may be connected to the MFC IC 1114 (e.g., the MFC IC 914 in FIG. 9), while the third coil 1111-3 may not be connected to the MFC IC 1114.

In the first mode, the MFC IC 1114 may receive power from the charger IC (e.g., the charger IC 916 of FIG. 9) in a first wireless power transmission operation, generate an AC waveform for power transmission, and provide the generated AC waveform AC2 to the first coil 1111-1 and the second coil 1111-2 connected in parallel. By the parallel connection, the first coil 1111-1 and the second coil 1111-2 may generate magnetic fields by the AC waveform AC2 provided to each of the first coil 1111-1 and the second coil 1111-2, thereby allowing the first wireless power to be transmitted to the first external electronic device. In the first mode, contrary to the first wireless power transmission operation, the MFC IC 1114 may perform a wireless power reception operation to receive power through the first coil 1111-1 and the second coil 1111-2 connected in parallel.

Referring to FIG. 12B, according to an embodiment, in the second mode, the first switch 1112-1 of the second multi-coil antenna circuit 1197 may switch off and the second switch 1112-2 may switch off. According to an embodiment, as the first switch 1112-1 switches off and the second switch 1112-2 switches off, the first coil 1111-1 is connected to the MFC IC 1114, whereas the first switch 1112-1 and the third coil 1111-3 may not be connected to the MFC IC 1114.

In the second mode, the MFC IC 1114 may receive power from the charger IC (e.g., the charger IC 916 of FIG. 9) for a second wireless power transmission operation, generate an AC waveform for power transmission, and provide the generated AC waveform AC2 to the first coil 1111-1. By the AC waveform AC2 provided to the first coil 1111-1, the first coil 1111-1 may generate a magnetic field, thereby allowing the second power to be wirelessly transmitted to the second external electronic device.

Referring to FIG. 12C, according to an embodiment, in the third mode, the first switch 1112-1 of the second multi-coil antenna circuit 1197 may switch off and the second switch 1112-2 may switch on. According to an embodiment, as the first switch 1112-1 switches off and the second switch 1112-2 switches on, the first coil 1111-1, the second coil 1111-2, and the third coil 1111-3 may be connected in series, and the first coil 1111-1, the second coil 1111-2, and the third coil 1111-3 connected in series may be connected to the MFC IC 1114.

According to an embodiment, in the third mode, the MFC IC 1114 may generate a DC on/off signal corresponding to the MST signal for MST operation and provide the generated DC on/off signal to the first coil 1111-1, the second coil 1111-2, and the third coil 1111-3 connected in series. As the DC on/off signal provided from the MFC IC 1114 is cut off by the Cs cap 1111-5 (e.g. Cs is an open circuit), the DC on/off signal provided from the MFC IC 1114 may flow through the third coil 1111-3, the second coil 1111-2, and the first coil 1111-1, and an MST signal corresponding to the DC on/off signal may be transmitted to the outside of the electronic device using the first coil 1111-1, the second coil 1111-2, and the third coil 1111-3 connected in series. For example, the MST signal may be a signal associated with magnetic credit card information in the electronic device 901.

According to an embodiment, an electronic device (e.g., the electronic device 101 of FIG. 1, the electronic device 301 of FIG. 3, or the electronic device 901 of FIG. 9) comprises a battery (e.g., the battery 189 of FIG. 1, the battery 389 of FIG. 3, or the battery 989 of FIG. 9), an antenna module (e.g., the antenna module 197 of FIG. 1, the multi-coil antenna 997 of FIG. 9, the first multi-coil antenna 1097 of FIG. 10, or the second multi-coil antenna 1197 of FIG. 11) including a first coil (e.g., the first coil 211-1 of FIG. 2, the first coil 897a-1 of FIG. 8A, the first coil 897b-1 of FIG. 8B, the first coil 1011-1 of FIG. 10, or the first coil 1111-1 of FIG. 11) and a second coil (e.g., the second coil 211-2 of FIG. 2, the second coil 897a-2 of FIG. 8A, the second coil 897b-2 of FIG. 8B, the second coil 1011-2 of FIG. 10, or the second coil 1111-2 of FIG. 11), at least one switch (e.g., the switch 912 of FIG. 9, the switch 1012 of FIG. 10, or the first switch 1112-1 and second switch 1112-2 of FIG. 11) electrically connected with the antenna module, a magnetic field controller (e.g., the MFC IC 214 of FIG. 2, the MFC IC 314 of FIG. 3, the MFC IC 514 of FIG. 5, the MFC IC 614 of FIG. 6, the MFC IC 914 of FIG. 9, or the MFC IC 1114 of FIGS. 12A to 12C) electrically connected with the antenna module, a charger (e.g., the charger IC 916 of FIG. 9) electrically connected with the battery and the magnetic field controller, and at least one processor (e.g., the processor 120 of FIG. 1, the processor 220 of FIG. 2, or the processor 920 of FIG. 9) electrically connected with the one or more switches, the magnetic field controller, and the charger. The at least one processor is configured to, based on an operation mode associated with the antenna module, control the one or more switches to connect the first coil with the magnetic field controller, or to connect the first coil and the second coil in parallel and allow the first coil and the second coil connected in parallel to connect with the magnetic field controller.

According to an embodiment, the electronic device may further comprise a third coil (e.g., the third coil 897a-3 of FIG. 8A, the third coil 897b-3 of FIG. 8B, the third coil 1011-3 of FIG. 10, or the third coil 1111-3 of FIG. 11). The at least one processor may be configured to control the one or more switches to connect the third coil with the magnetic field controller based on another operation mode associated with the antenna module.

According to an embodiment, the operation mode is a first mode or a second mode associated with the antenna module, and the another operation mode is a third mode. The first mode may be a mode for performing a wireless power reception operation or a first wireless power transmission operation, the second mode may be a mode for performing a second wireless power transmission operation, and the third mode may be a mode for performing a magnetic secure transmission operation.

According to an embodiment, the at least one processor may be configured to control the one or more switches to connect the first coil with the magnetic field controller in the second mode.

According to an embodiment, the at least one processor may be configured to control the one or more switches to connect the first coil and the second coil in parallel and allow the first coil and the second coil connected in parallel to connect with the magnetic field controller in the first mode.

According to an embodiment, the at least one processor may be configured to control the one or more switches to connect the third coil with the magnetic field controller in the third mode.

According to an embodiment, the first coil and the second coil may be included in an integrally-packaged multi-coil antenna. The second coil may be disposed outside the first coil.

According to an embodiment, the first coil, the second coil, and the third coil may be included in an integrally-packaged multi-coil antenna. The second coil may be disposed outside the first coil, and the third coil may be disposed outside the second coil.

According to an embodiment, an electronic device (e.g., the electronic device 101 of FIG. 1, the electronic device 301 of FIG. 3, or the electronic device 901 of FIG. 9) comprises a battery (e.g., the battery 189 of FIG. 1, the battery 389 of FIG. 3, or the battery 989 of FIG. 9), an antenna module (e.g., the antenna module 197 of FIG. 1, the multi-coil antenna 997 of FIG. 9, the first multi-coil antenna 1097 of FIG. 10, or the second multi-coil antenna 1197 of FIG. 11) including a first coil (e.g., the first coil 211-1 of FIG. 2, the first coil 897a-1 of FIG. 8A, the first coil 897b-1 of FIG. 8B, the first coil 1011-1 of FIG. 10, or the first coil 1111-1 of FIG. 11), a second coil (e.g., the second coil 211-2 of FIG. 2, the second coil 897a-2 of FIG. 8A, the second coil 897b-2 of FIG. 8B, the second coil 1011-2 of FIG. 10, or the second coil 1111-2 of FIG. 11), and a third coil (e.g., the third coil 897a-3 of FIG. 8A, the third coil 897b-3 of FIG. 8B, the third coil 1011-3 of FIG. 10, or the third coil 1111-3 of FIG. 11), a first switch (e.g., the switch 912 of FIG. 9, the switch 1012 of FIG. 10, or the first switch 1112-1 of FIG. 11) and a second switch (e.g., the switch 912 of FIG. 9, or the second switch 1112-2) electrically connected with the antenna module, a magnetic field controller (e.g., the MFC IC 214 of FIG. 2, the MFC IC 314 of FIG. 3, the MFC IC 514 of FIG. 5, the MFC IC 614 of FIG. 6, the MFC IC 914 of FIG. 9, or the MFC IC 1114 of FIGS. 12A to 12C) electrically connected with the antenna module, a charger (e.g., the charger IC 916 of FIG. 9) electrically connected with the battery and the magnetic field controller, and at least one processor (e.g., the processor 120 of FIG. 1, the processor 220 of FIG. 2, or the processor 920 of FIG. 9) electrically connected with the first switch, the second switch, the magnetic field controller, and the charger. The at least one processor is configured to control the first switch and/or the second switch to be switched on or off in order to connect the first coil and the second coil in parallel and allow the first coil and the second coil connected in parallel to connect to the magnetic field controller based on a first mode associated with the antenna module, connect the first coil with the magnetic field controller based on a second mode associated with the antenna module, and connect the third coil with the magnetic field controller based on a third mode associated with the antenna module.

According to an embodiment, the first mode may be a mode for performing a wireless power reception operation or a first wireless power transmission operation, the second mode may be a mode for performing a second wireless power transmission operation, and the third mode may be a mode for performing a magnetic secure transmission operation.

Figure 13:
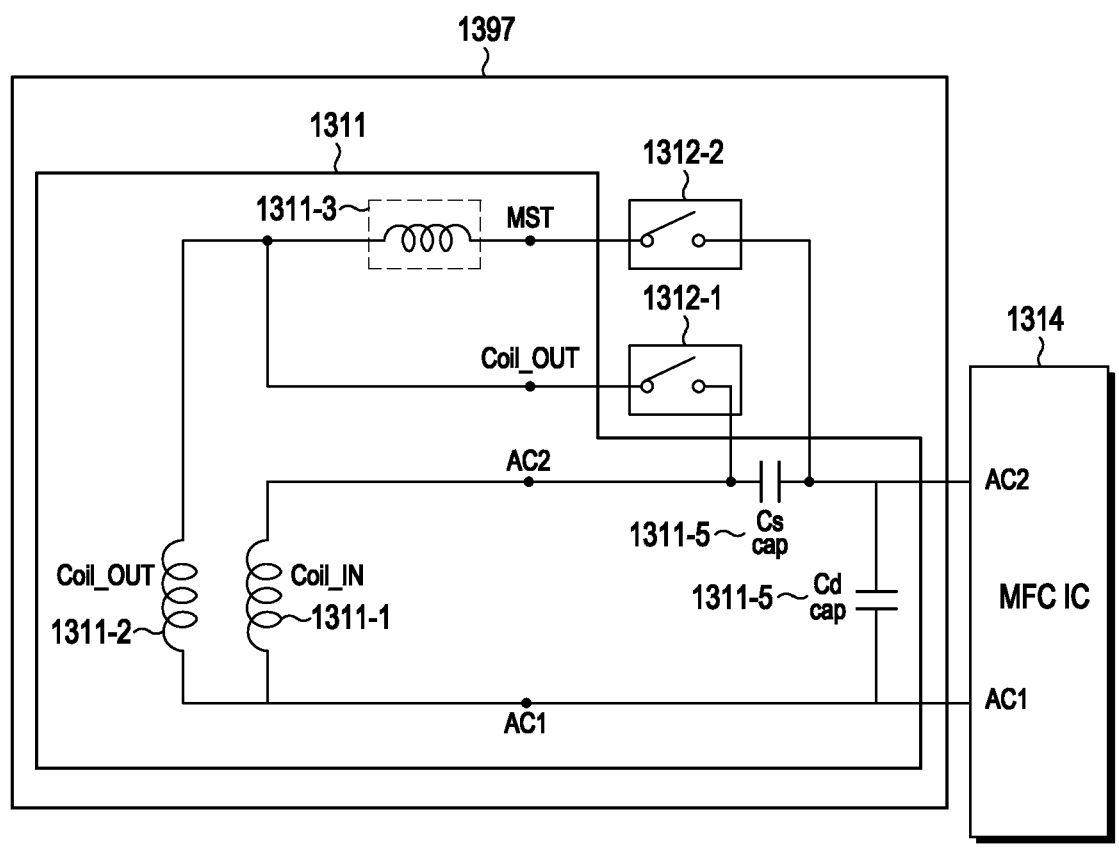
FIG. 13 is a view illustrating a third multi-coil antenna circuit according to an embodiment.

FIG. 13 is a view illustrating a third multi-coil antenna circuit according to an embodiment.

Referring to FIG. 13, according to an embodiment, an electronic device (e.g., the electronic device 101 of FIG. 1 or the electronic device 901 of FIG. 9) may include a third multi-coil antenna circuit 1397 instead of the second multi-coil antenna circuit 1197. According to an embodiment, the third multi-coil antenna circuit 1397 may be a circuit equivalent to the second multi-coil antenna circuit 1197.

According to an embodiment, the third multi-coil antenna circuit 1397 (e.g., the antenna module 197 of FIG. 1 or the multi-coil antenna circuit 997 of FIG. 9) may include a multi-coil antenna 1311 that includes a first coil 1311-1, a second coil 1311-2, a third coil 1311-3, and at least one capacitor (e.g., Cs cap and Cd cap) 1311-5, a first switch 1312-1, and a second switch 1312-2.

According to an embodiment, the multi-coil antenna 1311 may have the first coil 1311-1, the second coil 1311-2, the third coil 1311-3, and the capacitors 1311-5 packaged integrally. According to an embodiment, the first coil 1311-1 and the second coil 1311-2 may be coils used for wireless power transmission/reception (e.g., NFMI), and the third coil 1311-3 may be a coil used for MST. According to an embodiment, the multi-coil antenna 1311 may include a conductive pattern (e.g., a third conductive pattern, a pattern resistor, or a meander-type resistor) instead of the third coil 1311-3 and may be used for MST.

According to an embodiment, the first coil 1311-1 may be included at an inside (Coil_IN) of the multi-coil antenna 1311, and a second coil 1311-2 may be included at an outside (Coil_OUT) of the first coil 1311-1. The third coil 1311-3 may be included outside the second coil 1311-2. For example, the first coil 1311-1 may be connected to an MFC IC 1314 (e.g., the MFC IC 1114 of FIG. 11), and the second coil 1311-2 may be connected to the first coil 1311-1. The third coil 1311-3 may be connected to the second coil 1311-2.

According to an embodiment, the first coil 1311-1 may have a length (or number of turns) suitable for wireless transmission of second power to a second external electronic device using the first coil 1311-1. According to an embodiment, the second coil 1311-2 may have a length (or number of turns) suitable for wireless transmission of first power to a first external electronic device using the first coil 1311-1 and the second coil 1311-2 connected in parallel with each other. According to an embodiment, the third coil 1311-3 may have a length (or number of turns) suitable for MST operation using the first coil 1311-1, the second coil 1311-2, and the third coil 1311-3 connected in series.

According to an embodiment, the at least one capacitor (e.g., Cs cap and Cd cap) 1311-5 may have a capacitance necessary to allow the third multi-coil antenna circuit 1397 to maintain a designated inductance and resistance when wirelessly transmitting the second power to the second external electronic device through the first coil 1311-1 or wirelessly transmitting the first power to the first external electronic device through the first coil 1311-1 and the second coil 1311-2 connected in parallel.

According to an embodiment, the first switch 1312-1 may have an end connected to the first coil 1311-1 and the MFC IC (e.g., AC1 of the MFC IC 1314) and another end of the second coil 1311-2 and the third coil 1311-3. According to an embodiment, the second switch 1312-2 may have an end connected to the MFC IC 1314 (e.g., AC2 of the MFC IC 1314) and another end connected to the third coil 1311-3.

According to an embodiment, the first switch 1312-1 and the second switch 1312-2 may switch on or off according to the control based on the operation mode (first mode, second mode, or third mode) of a processor (e.g., the processor 120 of FIG. 1 or the processor 920 of FIG. 9). According to an embodiment, the first switch 1312-1 may switch on and the second switch 1312-2 may switch off in the first mode. According to an embodiment, the first switch 1312-1 and the second switch 1312-2 may switch off according to the second mode. According to an embodiment, the first switch 1312-1 may switch off and the second switch 1312-2 may switch on in the third mode. For example, when the first switch 1312-1 switches on and the second switch 1312-2 switches off in the first mode, the first coil 1311-1 and the second coil 1311-2 may be connected in parallel, and the first coil 1311-1 and the second coil 1311-2 connected in parallel may be connected to the MFC IC 1314 while the third coil 1311-3 may not be connected to the MFC IC 1314. For example, when the first switch 1312-1 and the second switch 1312-2 switch off in the second mode, the first coil 1311-1 may be connected to the MFC IC 1314 while the third coil 1311-3 may not be connected to the MFC IC 1314. For example, in the third mode, when the first switch 1312-1 switches off and the second switch 1312-2 switches on, the first coil 1311-1 and the second coil 1311-2 are not connected to the MFC IC 1314, but the third coil 1311-3 may be connected to the MFC IC 1314.

According to an embodiment, the MFC IC 1314 may perform wireless power reception operation or first wireless power transmission operation in the first mode, second wireless power transmission operation in the second mode, and MST operation in the third mode.

For example, in the first mode, upon receiving wireless power, the MFC IC 1314 may perform power processing, such as rectifying the AC waveform of power received through the first coil 1311-1 and the second coil 1311-2 connected in parallel into a DC waveform, converting the voltage, or regulating the power, and transfer the same to the charger IC (e.g., the charger IC 916). For example, in a first wireless power transmission operation, the MFC IC 1314 may receive power from the charger IC 916, generate an AC waveform for power transmission, and generate a magnetic field through the first coil 1311-1 and the second coil 1311-2 connected in parallel based on the generated AC waveform to allow the first power to be wirelessly transmitted through the magnetic field.

For example, in the second mode, the MFC IC 1314 may receive power from the charger IC 916 in a second wireless power transmission operation, generate an AC waveform for power transmission, and generate a magnetic field through the first coil 1311-1 based on the generated AC waveform, allowing the second power to be wirelessly transmitted to the second external electronic device through the magnetic field.

For example, in the third mode, the MFC IC 1314 may wirelessly transmit magnetic credit card information in the electronic device 901 through the third coil 1311-3 in an MST operation, allowing the same to be used for payment. According to an embodiment, a third conductive pattern (e.g., a pattern resistor or meander-type resistor) may be used instead of the third coil 1311-3.

TABLE 3

|  |  | First switch | Second switch | Mode |
|---|---|---|---|---|
| RX mode |  | ◯ | X | first mode |
| TX mode | Ping | ◯ | X |  |
|  | P2P | ◯ | X |  |
|  | P2G | X | X | second mode |
| MST mode |  | X | ◯ | third mode |

Table 3 above is a table representing an example of switching on or off of the first switch 1312-1 and the second switch 1312-3 based on the operation mode of the electronic device in the second multi-coil antenna circuit 1397 according to an embodiment. Referring to Table 3, a processor (e.g., the processor 120 of FIG. 1 or the processor 920 or MFC IC 1314 of FIG. 9) may control the first switch 1312-1 to switch on and the second switch 1312-2 to switch off in the first mode, control the first switch 1312-1 and the second switch 1312-2 to switch off in the second mode, and control the first switch 1312-1 to switch off and the second switch 1312-2 to switch on in the third mode. According to an embodiment, the first mode may include a power reception mode (RX mode) and a first power transmission mode (Ping or P2P). For example, the power reception mode may be a state (or mode) in which the second electronic device 901 receives power from an external electronic device. According to an embodiment, the first power transmission mode may be a mode in which the electronic device 901 transmits the power to the first external electronic device. For example, Ping may be a state in which the electronic device 901 transmits a Ping signal to transmit the first power to the first external electronic device, and P2P (phone to phone) may be a state in which the electronic device 901 (e.g., a phone) transmits the first power to the first external electronic device (e.g., a phone).

According to an embodiment, the second mode may be a mode in which the electronic device 901 transmits the second power to the second external electronic device. For example, P2G (phone to gear) may be a state in which the electronic device 901 (e.g., a phone) transmits the second power to the second external electronic device (e.g., a watch).

According to an embodiment, the third mode may be an MST mode. For example, the MST mode may be a state in which magnetic credit card information in the electronic device 901 is wirelessly transmitted to an outside to be used for payment.

Figure 14:
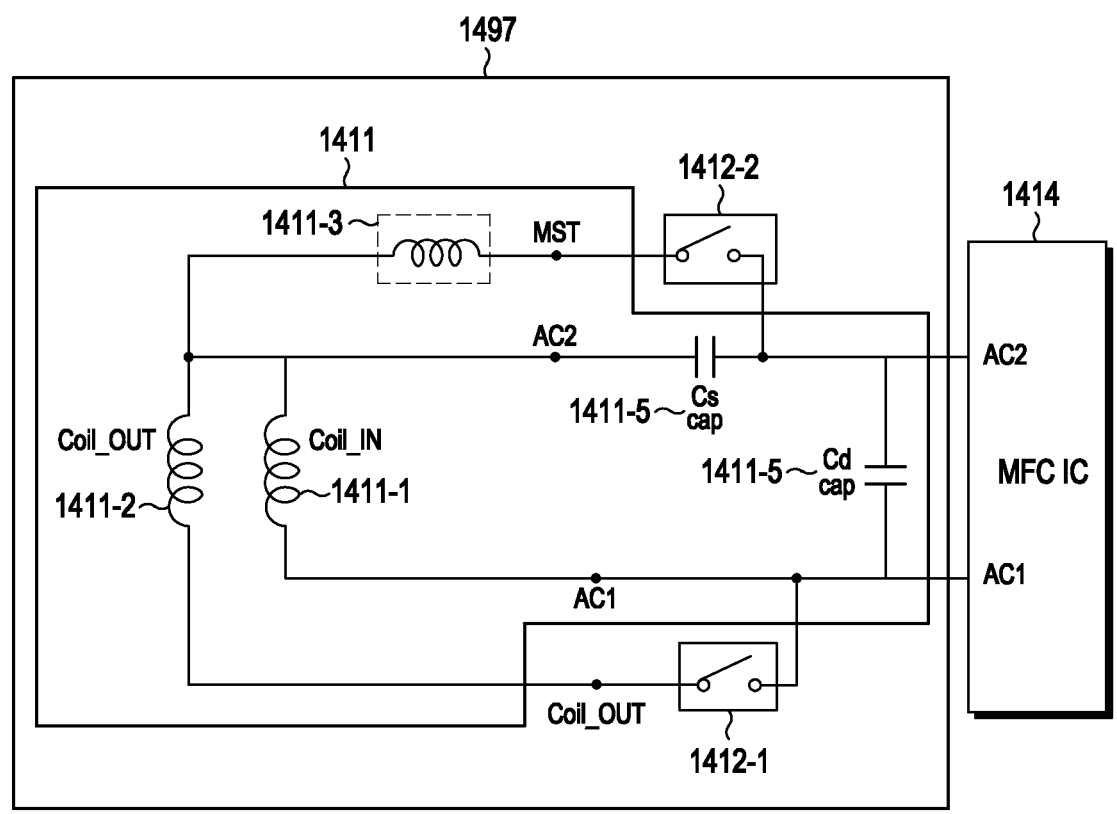
FIG. 14 is a view illustrating a fourth multi-coil antenna circuit according to an embodiment.

FIG. 14 is a view illustrating a fourth multi-coil antenna circuit according to an embodiment.

Referring to FIG. 14, according to an embodiment, an electronic device (e.g., the electronic device 101 of FIG. 1 or the electronic device 901 of FIG. 9) may include a fourth multi-coil antenna circuit 1497 instead of the second multi-coil antenna circuit 1197 or the third multi-coil antenna circuit 1397.

According to an embodiment, the third multi-coil antenna circuit 1497 (e.g., the antenna module 197 of FIG. 1 or the multi-coil antenna circuit 997 of FIG. 9) may include a multi-coil antenna 1411 that includes a first coil 1411-1, a second coil 1411-2, a third coil 1411-4, and at least one capacitor (e.g., Cs cap and Cd cap) 1411-5, a first switch 1412-1, and a second switch 1412-2.

According to an embodiment, the multi-coil antenna 1311 may have the first coil 1411-1, the second coil 1411-2, the third coil 1411-3 and the capacitors 1411-5 integrally packaged. According to an embodiment, the first coil 1411-1 and the second coil 1411-2 may be coils used for wireless power transmission/reception (e.g., NFMI), and the third coil 1411-3 may be a coil used for MST. According to an embodiment, the multi-coil antenna 1411 may include a conductive pattern (e.g., a third conductive pattern, a pattern resistor, or a meander-type resistor) instead of the third coil 1411-3 and may be used for MST.

According to an embodiment, the first coil 1411-1 may be included at an inside (Coil_IN) of the multi-coil antenna 1411, and a second coil 1411-2 may be included at an outside (Coil_OUT) of the first coil 1411-1. The third coil 1411-3 may be included outside the second coil 1411-2. For example, the first coil 1411-1 may have an end connected with the MFC IC 1414 (e.g., the MFC IC 1114 of FIG. 11) and another end connected with the second coil 1411-2 and the third coil 1411-3, the second coil 1411-2 may have an end connected with the first coil 1411-1 and the third coil 1411-3 and another end connected with the first switch 1412-1, and the third coil 1411-3 may have an end connected with the first coil 1411-1 and the second coil 1411-2 and another end connected with the second switch 1412-2.

According to an embodiment, the first coil 1411-1 may have a length (or number of turns) suitable for wireless transmission of second power to a second external electronic device using the first coil 1411-1. According to an embodiment, the second coil 1411-2 may have a length (or number of turns) suitable for wireless transmission of first power to a first external electronic device using the first coil 1411-1 and the second coil 1411-2 connected in parallel with each other. According to an embodiment, the third coil 1411-3 may have a length (or number of turns) suitable for MST operation using the first coil 1411-1, the second coil 1411-2, and the third coil 1411-3 connected in series.

According to an embodiment, the at least capacitor (e.g., Cs cap and Cd cap) 1411-5 may have a capacitance necessary to allow the fourth multi-coil antenna circuit 1497 to maintain a designated inductance and resistance when wirelessly transmitting the second power to the second external electronic device through the first coil 1411-1 or wirelessly transmitting the first power to the first external electronic device through the first coil 1411-1 and the second coil 1411-2 connected in parallel.

According to an embodiment, the first switch 1412-1 may have an end connected between the first coil 1411-1 and the MFC IC 1414 and another end connected with the second coil 1411-2. According to an embodiment, the second switch 1412-2 may have an end connected between the first coil 1411-1 and the MFC IC 1414 and another end connected with the third coil 1411-3.

According to an embodiment, the first switch 1412-1 and the second switch 1412-2 may switch on or off according to the control based on the operation mode (first mode, second mode, or third mode) of a processor (e.g., the processor 120 of FIG. 1 or the processor 920 of FIG. 9). According to an embodiment, the first switch 1412-1 may switch on and the second switch 1412-2 may switch off in the first mode. According to an embodiment, in the second mode, the first switch 1412-1 and the second switch 1412-2 may switch off. According to an embodiment, in the third mode, the first switch 1412-1 and the second switch 1412-2 may switch on. For example, when the first switch 1412-1 switches on and the second switch 1412-2 switches off in the first mode, the first coil 1411-1 and the second coil 1411-2 may be connected in parallel, and the first coil 1411-1 and the second coil 1411-2 connected in parallel may be connected to the MFC IC 1414 while the third coil 1411-3 may not be connected to the MFC IC 1414. For example, when the first switch 1412-1 and the second switch 1412-2 switch off in the second mode, the first coil 1411-1, of the first coil 1411-1 and the second coil 1411-2, may be connected to the MFC IC 1414, and the second coil 1411-2 and the third coil 1411-3 may not be connected to the MFC IC 1414. For example, when the first switch 1412-1 and the second switch 1412-2 switch on in the third mode, the first coil 1411-1 and the second coil 1411-2 connected in parallel may be connected in series with the third coil 1411-3, and the first coil 1411-1 and the second coil 1411-2 connected in parallel, and third coil 1411-3 connected in series with the first coil 1411-1 and the second coil 1411-2 may be connected with the MFC IC 1414.

According to an embodiment, the MFC IC 1414 may perform wireless power reception operation or first wireless power transmission operation in the first mode, second wireless power transmission operation in the second mode, and MST operation in the third mode.

For example, in the first mode, upon receiving wireless power, the MFC IC 1414 may perform power processing, such as rectifying the AC waveform of power received through the first coil 1411-1 and the second coil 1411-2 connected in parallel into a DC waveform, converting the voltage, or regulating the power, and transfer the same to the charger IC (e.g., the charger IC 916). For example, in a first wireless power transmission operation, the MFC IC 1414 may receive power from the charger IC 916, generate an AC waveform for power transmission, and generate a magnetic field through the first coil 1411-1 and the second coil 1411-2 connected in parallel based on the generated AC waveform to allow the second power to be wirelessly transmitted through the magnetic field.

For example, in the second mode, the MFC IC 1414 may receive power from the charger IC 916 in a second wireless power transmission operation, generate an AC waveform for power transmission, and generate a magnetic field through the first coil 1411-1 based on the generated AC waveform, allowing the second power to be wirelessly transmitted to the second external electronic device through the magnetic field.

For example, in the third mode, the MFC IC 1414 may wirelessly transmit magnetic credit card information in the electronic device 901 through the third coil 1411-3 connected in series with the first coil 1411-1 and the second coil 1411-2 in an MST operation, allowing the same to be used for payment.

TABLE 4

|  |  | First switch | Second switch | Mode |
|---|---|---|---|---|
| RX mode |  | ○ | X | first mode |
| TX mode | Ping | ○ | X |  |
|  | P2P | ○ | X |  |
|  | P2G | X | X | second mode |
| MST mode |  | ○ | ○ | third mode |

Table 4 above is a table representing an example of switching on or off of the first switch 1412-1 and the second switch 1412-4 based on the operation mode of the electronic device in the second multi-coil antenna circuit 1497 according to an embodiment. Referring to Table 4, a processor (e.g., the processor 120 of FIG. 1 or the processor 920 or MFC IC 1414 of FIG. 9) may control the first switch 1412-1 to switch on and the second switch 1412-2 to switch off in the first mode, control the first switch 1412-1 and the second switch 1412-2 to switch off in the second mode, and control the first switch 1412-1 and the second switch 1412-2 to switch on in the third mode. According to an embodiment, the first mode may include a power reception mode (RX mode) and a first power transmission mode (Ping or P2P). For example, the power reception mode may be a state (or mode) in which the second electronic device 901 receives power from an external electronic device. According to an embodiment, the first power transmission mode may be a mode in which the electronic device 901 transmits the power to the first external electronic device. For example, Ping may be a state in which the electronic device 901 transmits a Ping signal to transmit the first power to the first external electronic device, and P2P (phone to phone) may be a state in which the electronic device 901 (e.g., a phone) transmits the first power to the first external electronic device (e.g., a phone).

According to an embodiment, the second mode may be a mode in which the electronic device 901 transmits power to the second external electronic device. For example, P2G (phone to gear) may be a state in which the electronic device 901 (e.g., a phone) transmits the second power to the second external electronic device (e.g., a watch).

According to an embodiment, the third mode may be an MST mode. For example, the MST mode may be a state in which magnetic credit card information in the electronic device 901 is wirelessly transmitted to an outside to be used for payment.

Figure 15:
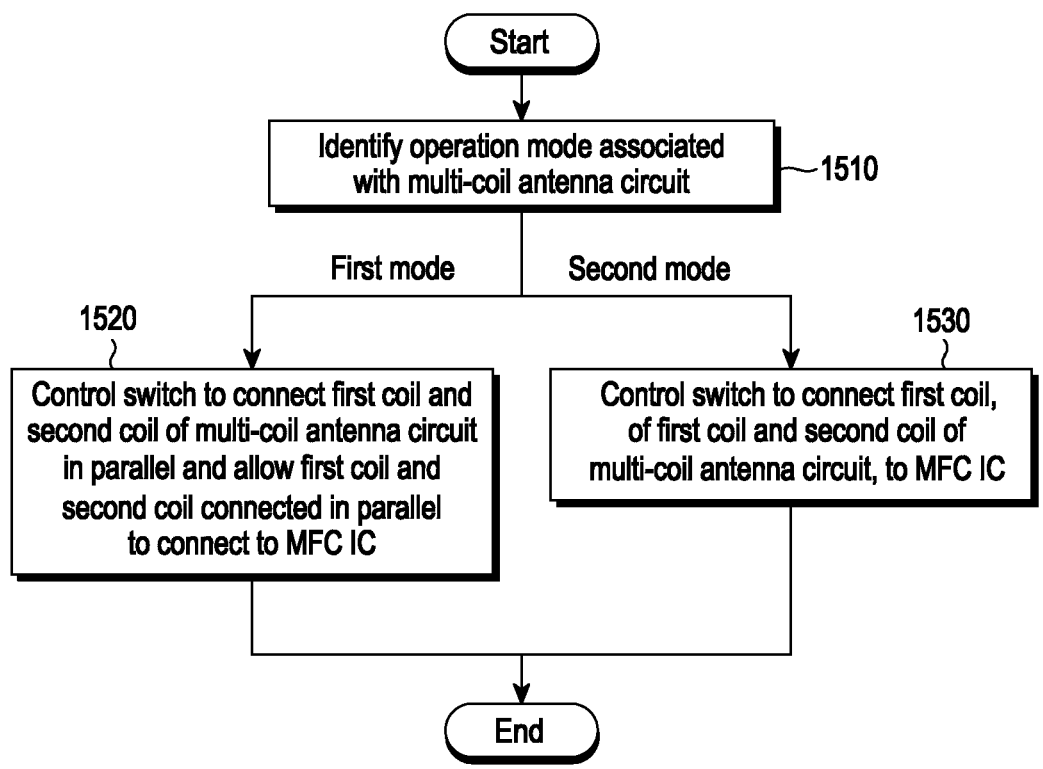
FIG. 15 is a flowchart illustrating a coil connection operation of a multi-coil antenna based on a first mode and a second mode in an electronic device according to an embodiment.

FIG. 15 is a flowchart illustrating a coil connection operation of a multi-coil antenna based on a first mode and a second mode in an electronic device according to an embodiment.

Referring to FIG. 15, according to an embodiment, a processor (e.g., the processor 120 of FIG. 1 or the processor 920 of FIG. 9) of an electronic device (e.g., the electronic device 101 of FIG. 1 or the electronic device 901 of FIG. 9) may perform at least one of operations 1510 to 1530.

In operation 1510, according to an embodiment, the processor 920 may identify an operation mode associated with a multi-coil antenna circuit (e.g., the antenna module 197 of FIG. 1, the multi-coil antenna circuit 997 of FIG. 9, the first multi-coil antenna circuit 1097 of FIG. 10, the second multi-coil antenna circuit 1197 of FIG. 11, the third multi-coil antenna circuit 1397 of FIG. 13, or the fourth multi-coil antenna circuit 1497 of FIG. 14). According to an embodiment, operation modes associated with the multi-coil antenna circuit 997 may include a first mode and a second mode. For example, the first mode may be a mode for performing wireless power reception operation or a mode for performing a first wireless power transmission operation, and the second mode may be a mode for performing a second wireless power transmission operation.

In operation 1520, according to an embodiment, when the first mode is identified, the processor 920 may control a switch to connect a first coil (e.g., the first coil 1011-1 of FIG. 10, the first coil 1111-1 of FIG. 11, the first coil 1311-1 of FIG. 13, or the first coil 1411-1 of FIG. 14) and a second coil (e.g., the second coil 1011-2, the second coil 1111-2 of FIG. 11, the second coil 1311-2 of FIG. 13, or the second coil 1411-2 of FIG. 14) in parallel and to allow the first coil 1011-1 and the second coil 1011-2, connected in parallel, to connect to the MFC IC 914 (e.g., control the first switch (e.g., the switch 1012 of FIG. 10, the first switch 1112-1 of FIG. 11, the first switch 1312-1 of FIG. 13, or the first switch 1412-1 of FIG. 14)) to switch on). A wireless power reception operation or a first wireless power transmission operation may be performed by the MFC IC 914 through the first coil 1011-1 and the second coil 1011-2 connected in parallel.

In operation 1530, according to an embodiment, when the second mode is identified, the processor 920 may control the switch to connect the first coil 1011-1 of the multi-coil antenna circuit 997 to the MFC IC 914 (e.g., control the switch 1012 of FIG. 10 to switch off, control the first switch 1112-1 and the second switch 1211-2 of FIG. 11 to switch off, control the first switch 1312-1 and the second switch 1312-2 of FIG. 13 to switch off, or control the first switch 1412-1 and the second switch 1412-2 of FIG. 14 to switch off). With the first coil 1011-1 connected with the MFC IC 914, a second wireless power transmission operation may be performed through the first coil 1011-1.

Figure 16:
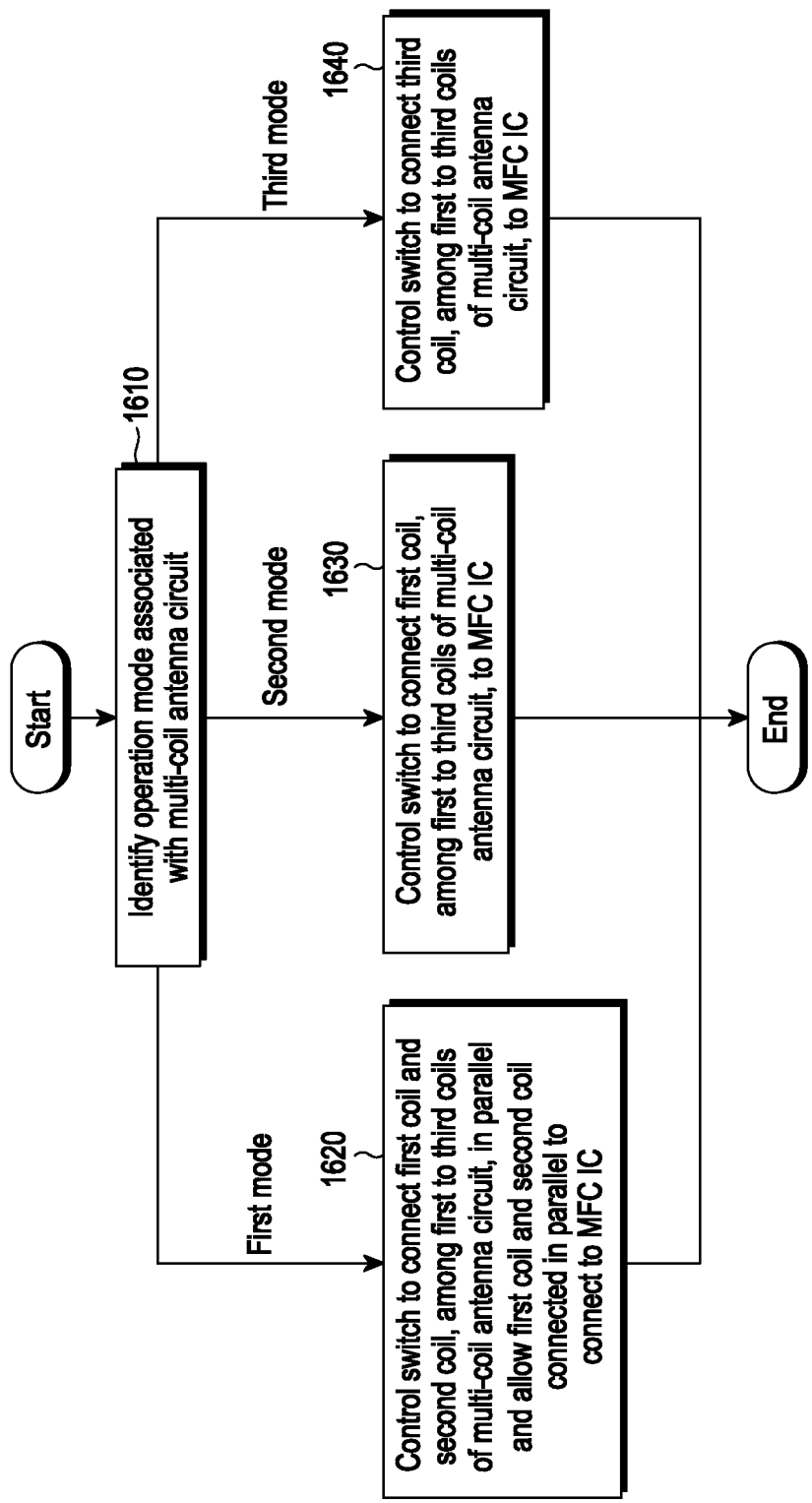
FIG. 16 is a flowchart illustrating a coil connection operation of a multi-coil antenna based on a first mode, a second mode, and a third mode in an electronic device according to an embodiment.

FIG. 16 is a flowchart illustrating a coil connection operation of a multi-coil antenna based on a first mode, a second mode, and a third mode in an electronic device according to an embodiment.

Referring to FIG. 16, according to an embodiment, a processor (e.g., the processor 120 of FIG. 1 or the processor 920 of FIG. 9) of an electronic device (e.g., the electronic device 101 of FIG. 1 or the electronic device 901 of FIG. 9) may perform at least one of operations 1610 to 1640.

In operation 1610, according to an embodiment, the processor 920 may identify an operation mode associated with a multi-coil antenna circuit (e.g., the antenna module 197 of FIG. 1, the multi-coil antenna circuit 997 of FIG. 9, the second multi-coil antenna circuit 1197 of FIG. 11, the third multi-coil antenna circuit 1397 of FIG. 13, or the fourth multi-coil antenna circuit 1497 of FIG. 14). According to an embodiment, the operation modes associated with the multi-coil antenna circuit 997 may include a first mode, a second mode, and a third mode. For example, the first mode may be a mode for performing wireless power reception operation or a mode for performing a first wireless power transmission operation, and the second mode may be a mode for performing a second wireless power transmission operation. The third mode may be a mode for performing MST operation.

In operation 1620, according to an embodiment, when the first mode is identified, the processor 920 may control a switch to connect a first coil (e.g., the first coil 1011-1 of FIG. 10, the first coil 1111-1 of FIG. 11, the first coil 1311-1 of FIG. 13, or the first coil 1411-1 of FIG. 14) and a second coil (e.g., the second coil 1011-2, the second coil 1111-2 of FIG. 11, the second coil 1311-2 of FIG. 13, or the second coil 1411-2 of FIG. 14) in parallel and to allow the first coil 1111-1 and the second coil 1111-2, connected in parallel, to connect to an MFC IC (e.g., the MFC IC 1114 of FIG. 9) (e.g., control the first switch (e.g., the switch 1012 of FIG. 10, the first switch 1112-1 of FIG. 11, the first switch 1312-1 of FIG. 13, or the first switch 1412-1 of FIG. 14)) to switch on). A wireless power reception operation or the first wireless power transmission operation may be performed by the MFC IC 1114 through the first coil 1111-1 and the second coil 1111-2 connected in parallel.

In operation 1630, according to an embodiment, when the second mode is identified, the processor 920 may control the switch to connect the first coil 1111-1 of the multi-coil antenna circuit 997 to the MFC IC 1114 (e.g., control the switch 1012 of FIG. 10 to switch off, control the first switch 1112-1 and the second switch 1211-2 of FIG. 11 to switch off, control the first switch 1312-1 and the second switch 1311-2 of FIG. 13 to switch off, or control the first switch 1412-1 and the second switch 1411-2 of FIG. 14 to switch off). With the first coil 1011-1 connected with the MFC IC 914, a second wireless power transmission operation may be performed through the first coil 1011-1.

In operation 1640, according to an embodiment, when the third mode is identified, the processor 920 may control the switch to connect the first coil 1111-1, the second coil 1111-2, and the third coil 1111-3 of the multi-coil antenna circuit 997 in series and to allow them to connect to the MFC IC 1114 (e.g., control the first switch 1112-1 of FIG. 11 to switch off and the second switch 1211-2 to switch on). With the first coil 1111-1, the second coil 1111-2, and the third coil 1111-3, connected in series, connected with the MFC IC 1114, MST operation may be performed through the first coil 1111-1, the second coil 1111-2, and the third coil 1111-3 connected in series.

Figure 17:
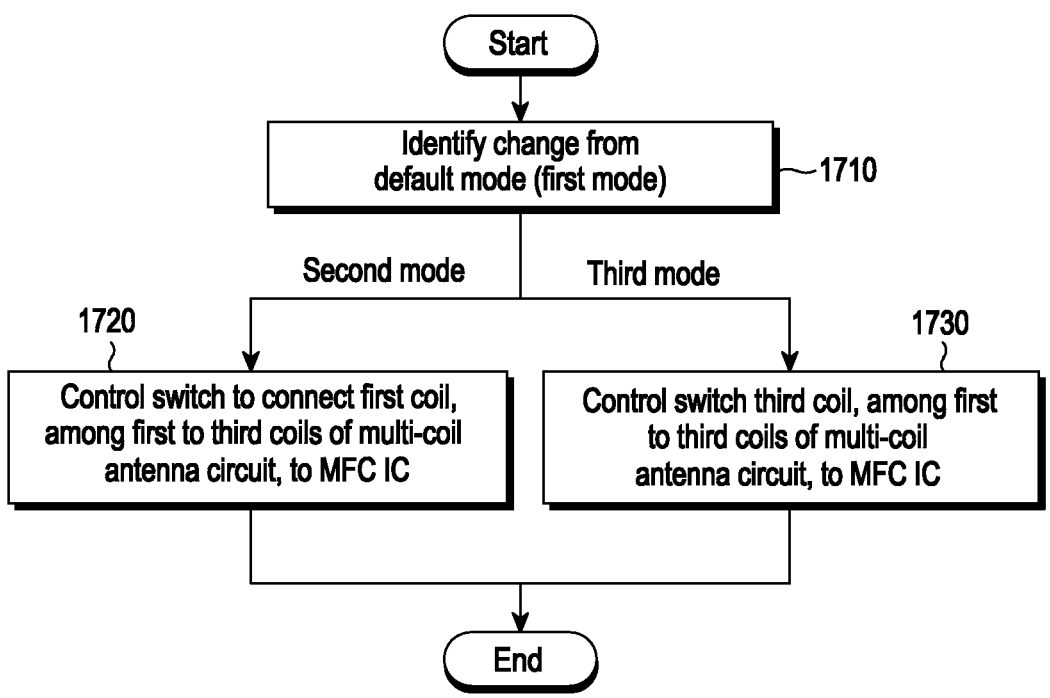
FIG. 17 is a flowchart illustrating a coil connection operation of a multi-coil antenna based on a change from a default mode (a first mode) to another mode in an electronic device according to an embodiment.

FIG. 17 is a flowchart illustrating a coil connection operation of a multi-coil antenna based on a change from a default mode (a first mode) to another mode in an electronic device according to an embodiment.

Referring to FIG. 17, according to an embodiment, a processor (e.g., the processor 120 of FIG. 1 or the processor 920 of FIG. 9) of an electronic device (e.g., the electronic device 101 of FIG. 1 or the electronic device 901 of FIG. 9) may perform at least one of operations 1710 to 1730.

In operation 1710, according to an embodiment, the processor 920 may identify that an operation mode associated with a multi-coil antenna circuit (e.g., the antenna module 197 of FIG. 1, the multi-coil antenna circuit 997 of FIG. 9, the first multi-coil antenna circuit 1097 of FIG. 10, the second multi-coil antenna circuit 1197 of FIG. 11, the third multi-coil antenna circuit 1397 of FIG. 13, or the fourth multi-coil antenna circuit 1497 of FIG. 14) may be a default mode (first mode) and a change from the default mode to another mode (e.g., the second mode or the third mode) has occurred. For example, the first mode may be a mode for performing wireless power reception operation or a mode for performing a first wireless power transmission operation, and the second mode may be a mode for performing a second wireless power transmission operation. The third mode may be a mode for performing MST operation. In the first mode, the first coil 1111-1 and the second coil 1111-2 of the multi-coil antenna circuit 1197 may be connected in parallel by a switch (e.g., the switching on of the first switch 1112-1 or the switching off of the second switch 1112-2), and the first coil 1111-1 and the second coil 1111-2 connected in parallel may be connected with the MFC IC 1114.

In operation 1720, when a change from the first mode to the second mode is identified, the processor 920 may control the switch to connect the first coil 1111-1 of the multi-coil antenna circuit 997 to the MFC IC 1114 (e.g., switch off the first switch 1112-1 or switch off the second switch 1112-2). With the first coil 1111-1 connected with the MFC IC 914, a second wireless power transmission operation may be performed through the first coil 1111-1.

In operation 1730, when a change from the first mode to the third mode is identified, the processor 920 may control the switch to connect the first coil 1111-1, the second coil 1111-2, and the third coil 1111-3 of the multi-coil antenna circuit 997 in series and to allow them to connect to the MFC IC 1114 (e.g., switch off the first switch 1112-1 or switch on the second switch 1112-2). With the first coil 1111-1, the second coil 1111-2, and the third coil 1111-3, connected in series, connected with the MFC IC 1114, an MST operation may be performed through the first coil 1111-1, the second coil 1111-2, and the third coil 1111-3 connected in series.

According to an embodiment, a method for connecting coils of a multi-coil antenna in an electronic device (e.g., the electronic device 101 of FIG. 1 or the electronic device 201 of FIG. 2) comprises identifying a first mode associated with an antenna module (e.g., the antenna module 197 of FIG. 1 or the antenna module 297 of FIG. 2) of the electronic device, and controlling one or more switches (e.g., the switch circuit 212 of FIG. 2) to connect a first coil (e.g., the first coil 31 of FIG. 3 or the first coil 511-1 of FIG. 5) and a second coil (e.g., the second coil 32 of FIG. 3 or the second coil 511-2 of FIG. 5) of the antenna module in parallel and allow the first coil and the second coil connected in parallel to connect with a magnetic field controller (e.g., the MFC IC 314 of FIG. 3 or the MFC IC 514 of FIG. 5) based on the identified first mode.

According to an embodiment, the method may further comprise identifying a second mode associated with the antenna module of the electronic device, and controlling the one or more switches to connect the first coil of the antenna module with the magnetic field controller based on the identified second mode.

According to an embodiment, the method may further comprise identifying a third mode associated with the antenna module of the electronic device, and controlling the one or more switches to connect a third coil of the antenna module with the magnetic field controller based on the identified the third mode.

According to an embodiment, the first mode may be a mode for performing a wireless power reception operation or a first wireless power transmission operation, the second mode may be a mode for performing a second wireless power transmission operation, and the third mode may be a mode for performing a magnetic secure transmission operation.

According to an embodiment, the first mode may be a default mode. The method may further comprise identifying the second mode when the default mode changes to the second mode.

According to an embodiment, the first mode may be a default mode. The method may further comprise identifying the third mode when the default mode changes to the third mode.

Figure 18A:
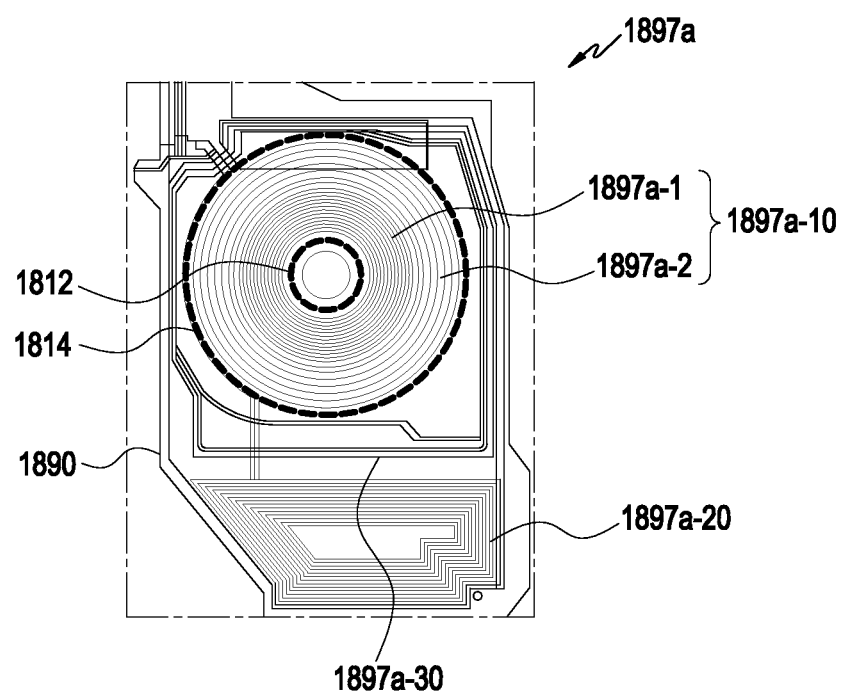
FIG. 18A is a view illustrating a first-type multi-coil antenna according to an embodiment.
Figure 18B:
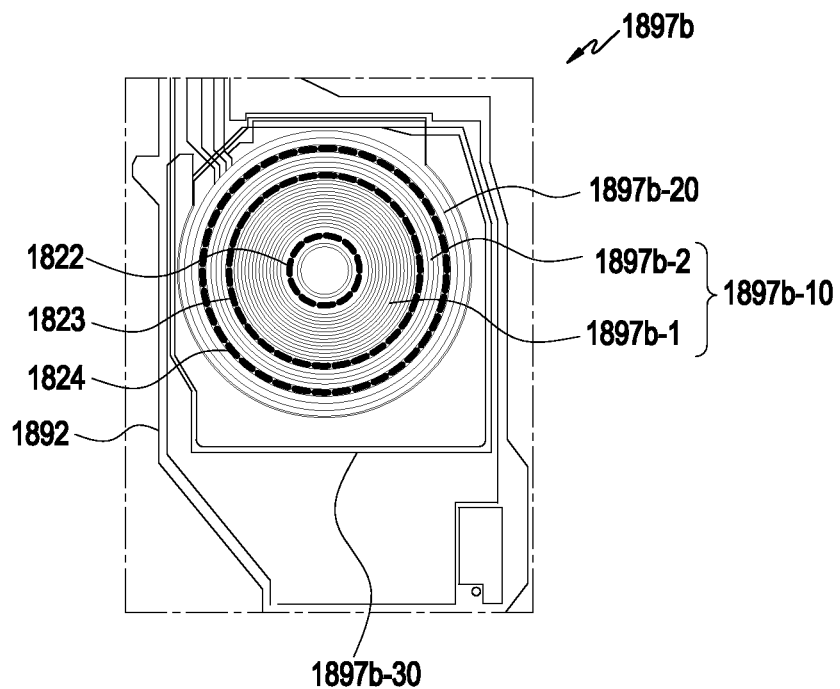
FIG. 18B is a view illustrating a second-type multi-coil antenna according to an embodiment.
Figure 18C:
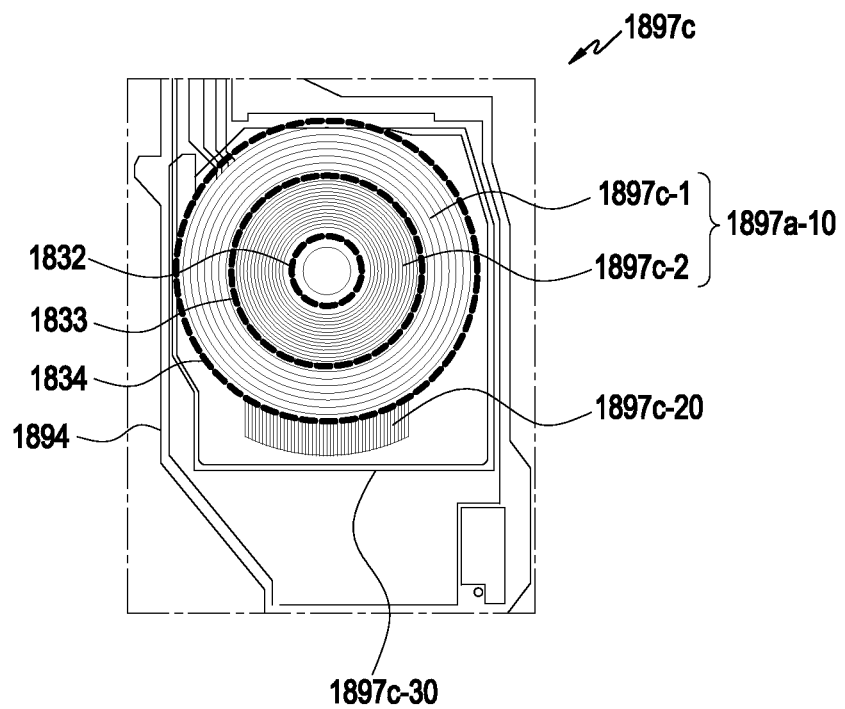
FIG. 18C is a view illustrating a third-type multi-coil antenna according to an embodiment.

FIGS. 18A to 18C are views illustrating various types of multi-coil antennas according to an embodiment.

FIG. 18A is a view illustrating a first-type multi-coil antenna according to an embodiment. FIG. 18B is a view illustrating a second-type multi-coil antenna according to an embodiment. FIG. 18C is a view illustrating a third-type multi-coil antenna according to an embodiment.

Referring to FIG. 18A, according to an embodiment, a first-type multi-coil antenna 1897a may include a dielectric substrate 1890 (e.g., a base layer) and may include a wireless power transmission/reception antenna 1897a-10, an MST antenna 1897a-20, and/or an NFC antenna 1897a-30 on a first surface (e.g., an upper surface) of the dielectric substrate 1890.

According to an embodiment, the wireless power transmission/reception antenna 1897a-10 and 897a-2 may be used to wirelessly transmit and receive power and may include at least one layer. According to an embodiment, the wireless power transmission/reception antenna 1897a-10 may be a serial dual-coil and may include a first coil 1897a-1 and a second coil 1897a-2 connected in series. The first coil 1897a-1 may be disposed inside the second coil 1897a-2. The first coil 1897a-1 and the second coil 1897a-2 may have different coil widths.

According to an embodiment, the MST antenna 1897a-20 may be disposed under the wireless power transmission/reception antenna 1897a-10. The MST antenna 1897a-20 may be used for payment by the electronic device (e.g., the electronic device 101 of FIG. 1 or the electronic device 901 of FIG. 9). The MST antenna 1897a-20 may include, e.g., a coil wound several times (about 8 times to 10 times) in a square shape.

According to an embodiment, the NFC antenna 1897a-30 may be formed on at least a portion (e.g., a middle portion or/and an upper portion) of the dielectric substrate 1890. The NFC antenna 1897a-30 may be used for short-range communication by the electronic device (e.g., the electronic device 101 of FIG. 1 or the electronic device 901 of FIG. 9). The inductance value of the NFC antenna 1897a-30 may be, e.g., less than about 1 uH. The NFC antenna 1897a-30 may be formed to surround the wireless power transmission/reception antenna 1897a-1 and 1897a-2 (e.g. outside the wireless power transmission/reception antenna 1897a-1 and 1897a-2). According to an embodiment, the first-type multi-coil antenna 1897a may not include the NFC antenna 1897a-30. According to an embodiment, the MST antenna 1897a-20 may be replaced with the NFC antenna 1897a-30.

Referring to FIG. 18B, according to an embodiment, a second-type multi-coil antenna 1897b may include a dielectric substrate 1892 (e.g., a base layer) and may include a wireless power transmission/reception antenna 1897b-10, an MST antenna 1897b-20, and/or an NFC antenna 1897b-30 on a first surface (e.g., an upper surface) of the dielectric substrate 1892.

According to an embodiment, the wireless power transmission/reception antenna 1897b-10 may be used to wirelessly transmit and receive power and may include at least one layer. According to an embodiment, the wireless power transmission/reception antenna 1897b-10 may include a first coil 1897b-1 and a second coil 1897b-2 that may be connected in series or in parallel using a switch (not shown). The first coil 1897b-1 may be disposed inside the second coil

1897b-2. The first coil 1897a-1 and the second coil 1897a-2 may have different coil widths.

According to an embodiment, the MST antenna 1897b-20 may be disposed to surround the second coil 1897b-2. The MST antenna 1897b-20 may be used for payment by the electronic device (e.g., the electronic device 101 of FIG. 1 or the electronic device 901 of FIG. 9). The MST antenna 1897b-20 may include, e.g., a coil wound several times (e.g., about eight times to ten times) outside the second coil 1897b-2.

According to an embodiment, the NFC antenna 1897b-30 may be formed on at least a portion (e.g., a middle portion or/and an upper portion) of the dielectric substrate 1892. The NFC antenna 1897b-30 may be used for short-range communication by the electronic device (e.g., the electronic device 101 of FIG. 1 or the electronic device 901 of FIG. 9). The inductance value of the NFC antenna 1897b-30 may be, e.g., less than about 1 uH. The NFC antenna 1897b-30 may be formed to surround the wireless power transmission/reception antenna 1897b-1 and 1897b-2 (e.g. outside the wireless power transmission/reception antenna 1897b-1 and 1897b-2). According to an embodiment, the second-type multi-coil antenna 1897b may not include the NFC antenna 1897b-30. According to an embodiment, the MST antenna 1897b-20 may be replaced with the NFC antenna 1897b-30.

Referring to FIG. 18C, according to an embodiment, a third-type multi-coil antenna 1897c may include a dielectric substrate 1894 (e.g., a base layer) and may include a wireless power transmission/reception antenna 1897c-10, an MST antenna 1897c-20, and/or an NFC antenna 1897c-30 on a first surface (e.g., an upper surface) of the dielectric substrate 1894.

According to an embodiment, the wireless power transmission/reception antenna 1897c-10 may be used to wirelessly transmit and receive power and may include at least one layer. According to an embodiment, the wireless power transmission/reception antenna 1897c-10 may include a first coil 1897c-1 and a second coil 1897c-2 that may be connected in series or in parallel using a switch (not shown). The first coil 1897c-1 may be disposed inside the second coil 1897c-2. The first coil 1897c-1 and the second coil 1897c-2 may have different coil widths.

According to an embodiment, the MST antenna 1897c-20 may be disposed in the form of a resistive pattern (e.g., a meander pattern) under the wireless power transmission/reception antenna 1897c-10. The MST antenna 1897c-20 may be used for payment by the electronic device (e.g., the electronic device 101 of FIG. 1 or the electronic device 901 of FIG. 9).

According to an embodiment, the NFC antenna 1897c-30 may be formed on at least a portion (e.g., a middle portion or/and an upper portion) of the dielectric substrate 1894. The NFC antenna 1897c-30 may be used for short-range communication by the electronic device (e.g., the electronic device 101 of FIG. 1 or the electronic device 901 of FIG. 9). The inductance value of the NFC antenna 1897c-30 may be, e.g., less than about 1 uH. The NFC antenna 1897c-30 may be formed to surround the wireless power transmission/reception antenna 1897c-1 and 1897c-2 (e.g. outside the wireless power transmission/reception antenna 1897c-1 and 1897c-2). According to an embodiment, the third-type multi-coil antenna 1897c may not include the NFC antenna 1897c-30. According to an embodiment, the MST antenna 1897c-20 may be replaced with the NFC antenna 1897c-30.

Table 5 below is an example table for comparing and describing the first-type multi-coil antenna 1897a, the second-type multi-coil antenna 1897b, and the third-type multi-coil antenna 1897c.

TABLE 5

| Type | | first-type multi-coil antenna | second-type multi-coil antenna | third-type multi-coil antenna |
|---|---|---|---|---|
| number of turns or pattern | first coil | 14 | 14 | 14 |
| | second coil | | 11 | 11 |
| | MST | 16 | 2 | lower pattern |
| shape | inner diameter of first coil | 14 | 14.3 | 13.3 |
| | outer diameter of first coil | | 28 | 28 |
| | outer diameter of second coil | 42 | 43 | 43 |
| | MST form | 15 turns of MST coil under first coil and second coil | 2 turns of MST coil outside first coil | MST resistive pattern under first coil and second coil |
| Inductance (Ls) (@100 KHz) | first coil | 9.04 | 7.21 | 7.3 |
| | second coil | | 11.4 | 11.46 |
| | first coil and second coil | | 7.21 | 7.3 |
| AC resistance (ACR) (@100 KHz) | first coil | | 0.56 | 0.49 |
| | second coil | 0.38 | 0.52 | 0.51 |
| | first coil and second coil | | 0.29 | 0.27 |
| | MST | 1.7 | 1.35 | 1.27 |
| wireless power transmission/reception to/from first external electronic device | first efficiency | 68.8 | 70.3 | 70.1 |
| | recognition distance | 11~12 | 10~12 | 10~11 |
| | first distance (Z) | 7 | 7 | 7 |
| wireless power transmission to second external electronic device | second efficiency | 26.4 | 37.4 | 33.6 |
| | second distance (Z) | 2.3 | 2.2 | 2.3 |
| MST operation | recognition region (standard: 45%) | 57.50% | 50.33% | 54.25% |

Referring to Table 5, in the first-type multi-coil antenna 1897a according to an embodiment, the number of turns of the first coil 1897a-1 and the second coil 1897a-2 connected in series may be 14, and the number of turns of the MST antenna 1897a-20 may be 16. In the second-type multi-coil antenna 1897b according to an embodiment, the number of turns of the first coil 1897b-1 may be 14, the number of turns of the second coil 1897b-2 may be 11, and the number of turns of the MST antenna 1897b-20 may be 2. In the third-type multi-coil antenna 1897c according to an embodiment, the number of turns of the first coil 1897c-1 may be 14, the number of turns of the second coil 1897b-2 may be 11, and the number of turns of the MST antenna 1897c-20 may be formed in a resistive pattern (e.g., a meander pattern). In the first-type multi-coil antenna 1897a according to an embodiment, the inner diameter 1812 of the first coil 1897a-1 may be about 14 mm, and the outer diameter 1814 of the second coil 1897a-2 may be about 42 mm, and the MST antenna 1897a-20 formed of a 15-turn MST coil may be included under the first and second coils 1897a-1 and 1897a-2. In the second-type multi-coil antenna 1897b according to an embodiment, the inner diameter 1822 of the first coil 1897b-1 may be about 14.3 mm, and the outer diameter 1824 of the first coil 1897b-1 may be about 28 mm, and the outer diameter 1824 of the second coil 1897b-2 may be about 43 mm, and the MST antenna 1897b-20 formed of a 2-turn MST coil may be included outside the second coil 1897b-2. In the third-type multi-coil antenna 1897c according to an embodiment, the inner diameter 1832 of the first coil 1897c-1 may be about 13.3 mm, and the outer diameter 1833 of the first coil 1897c-1 may be about 28 mm, and the outer diameter 1834 of the second coil 1897c-2 may be about 43 mm, and the MST antenna 1897a-20 formed in a resistive pattern (e.g., a meander pattern) may be included under the first and second coils 1897c-1 and 1897c-2. According to an embodiment, the inductance Ls of the first coil 1897a-1 and the second coil 1897a-2 connected in series of the first-type multi-coil antenna 1897a may be 9.04 uH at 100 KHz. According to an embodiment, the inductance Ls of the first coil 1897b-1 of the second-type multi-coil antenna 1897b may be about 7.21 uH at 100 KHz, and the inductance Ls of the second coil 1897b-2 may be about 11.4 uH at 100 KHz, and the inductance Ls of the first coil 1897b-1 and the second coil 1897b-2 connected in parallel may be about 7.21 uH. According to an embodiment, the inductance Ls of the first coil 1897c-1 of the third-type multi-coil antenna 1897c may be about 7.3 uH at 100 KHz, and the inductance Ls of the second coil 1897c-2 may be about 11.46 uH, and the inductance Ls of the first coil 1897c-1 and the second coil 1897c-2 connected in parallel may be about 7.3 uH. According to an embodiment, unlike the first-type multi-coil antenna 1897a, the second-type multi-coil antenna 1897b or the third-type multi-coil antenna 1897c does not experience a significant reduction in inductance Ls as compared with the inductance Ls of the first-type multi-coil antenna 1897a and thus make no or little difference in performance even when the first coil and the second coil 1897b-1 and 1897b-2 or 1897c-1 and 1897c-2 are connected in parallel.

According to an embodiment, the AC resistance ACR of the first coil 1897a-1 and the second coil 1897a-2 connected in series of the first-type multi-coil antenna 1897a may be about 0.38Ω at 100 KHz, and the AC resistance ACR of the MST antenna 1897a-20 may be about 1.7Ω at 100 KHz. According to an embodiment, the AC resistance ACR of the first coil 1897b-1 of the second-type multi-coil antenna 1897b may be about 0.56Ω at 100 KHz, the AC resistance ACR of the second coil 1897b-2 may be about 0.52Ω at 100 KHz, the AC resistance ACR of the first coil 1897b-1 and the second coil 1897b-2 connected in parallel may be about 0.29Ω, and the AC resistance of the MST antenna 1897b-20 may be about 1.35Ω at 100 KHz. According to an embodiment, the AC resistance ACR of the first coil 1897c-1 of the third-type multi-coil antenna 1897c may be about 0.49Ω at 100 KHz, the AC resistance ACR of the second coil 1897c-2 may be about 0.51Ω, the AC resistance ACR of the first coil 1897c-1 and the second coil 1897c-2 connected in parallel may be about 0.27Ω, and the AC resistance of the MST antenna 1897c-20 may be about 1.27Ω at 100 KHz. According to an embodiment, the AC resistances (e.g., about 0.29Ω or about 0.27Ω) of the first and second coils 1897b-1 and 1897b-2 or 1897c-1 and 1897c-2 connected in parallel of the second-type multi-coil antenna 1897b or the third-type multi-coil antenna 1897c may be smaller than the AC resistance, e.g., about 0.38Ω, of the first coil 1897a-1 and the second coil 1897a-2 connected in series of the first-type multi-coil antenna 1897a. For example, the second-type multi-coil antenna 1897b or the third-type multi-coil antenna 1897c does not experience deterioration of performance as compared with the first-type multi-coil antenna 1897a because its resistance is lowered although it has more turns than the first-type multi-coil antenna 1897a.

According to an embodiment, a first efficiency may be an efficiency when an electronic device (e.g., the electronic device 101 of FIG. 1 or the second electronic device 901 of FIG. 9) wirelessly transmits or receives power to/from a first external electronic device (e.g., a smartphone), and a second efficiency may be an efficiency when the electronic device (e.g., the electronic device 101 of FIG. 1 or the second electronic device 901 of FIG. 9) wirelessly transmits power to a second external electronic device (e.g., an accessory device or smart watch interworking with the second electronic device 901).

According to an embodiment, the first-type multi-coil antenna 1897a may wirelessly transmit and receive power to/from the first external electronic device using the first coil 1897a-1 and the second coil 1897a-2 connected in series and, in this case, the first efficiency (received power/transmitted power*100) may be about 68.8%, and the recognition distance may be about 11 mm~12 mm under a first condition (e.g., when there is no cover of the electronic device) and about 7 mm under a second condition (e.g., over the cover when there is a cover of the electronic device). According to an embodiment, the second-type multi-coil antenna 1897b may wirelessly transmit and receive power to/from the first external electronic device using the first coil 1897b-1 and the second coil 1897b-2 connected in parallel and, in this case, the first efficiency (received power/transmitted power*100) may be about 70.3%, and the recognition distance may be about 10 mm~12 mm under the first condition (e.g., when there is no cover of the electronic device) and about 7 mm under the second condition (e.g., over the cover when there is a cover of the electronic device). According to an embodiment, the third-type multi-coil antenna 1897c may wirelessly transmit and receive power to/from the first external electronic device using the first coil 1897c-1 and the second coil 1897c-2 connected in parallel and, in the case, the first efficiency (received power/transmitted power*100) may be about 70.1%, and the recognition distance may be about 10 mm~11 mm under the first condition (e.g., when there is no cover of the electronic device) and about 7 mm under the second condition (e.g., over the cover when there is a cover of the electronic device).

According to an embodiment, the first-type multi-coil antenna 1897*a* may wirelessly transmit power to the second external electronic device using the first coil 1897*a*-1 and the second coil 1897*a*-2 connected in series and, in this case, the second efficiency (received power/transmitted power*100) may be about 26.4%, and the recognition distance may be about 2.3 mm under the second condition (e.g., over the cover when there is a cover of the electronic device). According to an embodiment, the second-type multi-coil antenna 1897*b* may wirelessly transmit and receive power to/from the second external electronic device using the first coil 1897*b*-1, of the first coil 1897*b*-1 and the second coil 1897*b*-2 and, in this case, the second efficiency (received power/transmitted power*100) may be about 37.4%, and the recognition distance may be about 2.2 mm under the second condition (e.g., over the cover when there is a cover of the electronic device). According to an embodiment, the third-type multi-coil antenna 1897*c* may wirelessly transmit power to the second external electronic device using the first coil 1897*c*-1, of the first coil 1897*c*-1 and the second coil 1897*c*-2 and, in this case, the second efficiency (received power/transmitted power*100) may be about 33.6%, and the recognition distance may be about 2.3 mm under the second condition (e.g., over the cover when there is a cover of the electronic device). According to an embodiment, the first-type multi-coil antenna 1897*a* may have a recognition region of about 57.50% of the MST antenna 1897*a*-20 during an MST operation. According to an embodiment, the second-type multi-coil antenna 1897*b* may have a recognition region of about 50.30% of the MST antenna 1897*b*-20 during an MST operation. According to an embodiment, the third-type multi-coil antenna 1897*c* may have a recognition region of about 50.25% of the MST antenna 1897*c*-20 during an MST operation.

According to Table 5 above, although they may have more turns of the first coil and second coil 1897*b*-1 and 1897*b*-2 or 1897*c*-1 and 1897*c*-2 than the first-type multi-coil antenna 1897*a*, the second-type multi-coil antenna 1897*b* and the third-type multi-coil antenna 1897*c* have the first coil and the second coil 1897*b*-1 and 1897*b*-2 or 1897*c*-1 and 1897*c*-2 connected in parallel and use them in wirelessly transmitting/receiving power to/from the first external electronic device while using the internal first coil 1897*b*-1 or 1897*c*-1 in wirelessly transmitting/receiving power to/from the second external electronic device, thus exhibiting enhanced second efficiency and recognition distance in wirelessly transmitting power to the second external electronic device without deterioration of performance.

According to an embodiment, when a multi-coil antenna includes a first coil to a third coil, the first coil and the second coil are connected in parallel in the power reception mode or first power transmission mode. Therefore, since the resistance and inductance are managed as the sum for the parallel connection, a designated (or proper) inductance and resistance may be maintained although the length (or number of turns) of the first coil and/or second coil increases due to their being in parallel. Further, as the length (or number of turns) of the first coil is increased, power transmission may be carried out by the first coil alone. Therefore, power may be transmitted using the first coil in the second power transmission mode. Further, since the first coil, the second coil, and the third coil may be connected in series and used in the MST mode, the length (or number of turns) for MST may be reduced, thereby decreasing the area where the coils are placed and hence allowing the space to be used more efficiently.

According to an embodiment, there is provided an electronic device that includes a multi-coil antenna with a plurality of coils and capable of stably maintaining antenna performance.

In accordance with an embodiment, the electronic device may include a multi-coil antenna that in turn includes a plurality of coils and may selectively use some of the coils included in the multi-coil antenna for a particular wireless technology (or purpose) using at least one switch or change the connection structure of the coils to serial connection or parallel connection, thereby leading to an optimized antenna performance.

In accordance with an embodiment, the electronic device may select only some of the plurality of coils according to the purpose (e.g., wireless power transmission, wireless power reception, or magnetic secure communication) using at least one switch in the multi-coil antenna that includes the plurality of coils or change the connection of some of the plurality of coils to serial connection or parallel connection, thereby optimizing the performance in each purpose, reducing interference between the coils, and preventing deterioration of performance even though the plurality of coils are densely placed in a narrow space.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, there is provided a non-volatile storage medium storing instructions executed by at least one processor to enable the at least one processor to perform at least one operation including identifying a first mode associated with an antenna module of the electronic device, and controlling one or more switches to connect a first coil and a second coil of the antenna module in parallel and allow the first coil and the second coil connected in parallel to connect with a magnetic field controller based on the identified first mode.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The embodiments herein are provided merely for better understanding of the disclosure, and the disclosure should not be limited thereto or thereby. It should be appreciated by one of ordinary skill in the art that various changes in form or detail may be made to the embodiments without departing from the scope of the disclosure defined by the following claims.

The invention claimed is:

1. An electronic device, comprising:
a battery;
an antenna module including a first coil and a second coil;
at least one switch electrically connected with the antenna module;
a magnetic field controller electrically connected with the antenna module;
a charger electrically connected with the battery and the magnetic field controller;
at least one processor electrically connected with the at least one switch, the magnetic field controller, and the charger; and
memory storing instructions that, when executed by the at least one processor, cause the electronic device to:
based on a first mode associated with the antenna module, connect the first coil with the magnetic field controller through the at least one switch, and
based on a second mode associated with the antenna module, connect the first coil and the second coil in parallel and allow the first coil and the second coil connected in parallel to connect with the magnetic field controller through the at least one switch,
wherein the first coil is disposed in a first region of the antenna module, and the second coil is disposed in a second region of the antenna module, and wherein the second region surrounds the first region.

2. The electronic device of claim 1, wherein the first coil and the second coil are included in an integrally-packaged multi-coil antenna, and wherein the second coil is disposed outside the first coil.

3. The electronic device of claim 1, further comprising a third coil, wherein the instructions, when executed by the at least one processor, cause the electronic device to connect the third coil with the magnetic field controller through the at least one switch based on a third mode associated with the antenna module.

4. The electronic device of claim 3, wherein the first mode is a mode for performing a wireless power reception operation or a first wireless power transmission operation, the second mode is a mode for performing a second wireless power transmission operation, and the third mode is a mode for performing a magnetic secure transmission operation.

5. The electronic device of claim 3, wherein the first coil, the second coil, and the third coil are included in an integrally-packaged multi-coil antenna, and wherein the second coil is disposed outside the first coil, and the third coil is disposed outside the second coil.

6. An electronic device, comprising:
a battery;
an antenna module including a first coil, a second coil, and a third coil;
a first switch and a second switch electrically connected with the antenna module;
a magnetic field controller electrically connected with the antenna module;
a charger electrically connected with the battery and the magnetic field controller;
at least one processor electrically connected with the first switch, the second switch, the magnetic field controller, and the charger; and
memory storing instructions that, when executed by the at least one processor, cause the electronic device to:
connect the first coil and the second coil in parallel and allow the first coil and the second coil connected in parallel to connect with the magnetic field controller through on of the first switch based on a first mode associated with the antenna module,
connect the first coil with the magnetic field controller through off of the first switch based on a second mode associated with the antenna module, and
connect the third coil with the magnetic field controller through on of the second switch based on a third mode associated with the antenna module, and
wherein the first coil is disposed in a first region of the antenna module, and the second coil is disposed in a second region of the antenna module, and wherein the second region surrounds the first region.

7. The electronic device of claim 6, wherein the first mode is a mode for performing a wireless power reception operation or a first wireless power transmission operation, the second mode is a mode for performing a second wireless power transmission operation, and the third mode is a mode for performing a magnetic secure transmission operation.

8. A method for connecting coils of a multi-coil antenna in an electronic device, the method comprising:
identifying a first mode or a second mode associated with an antenna module of the electronic device;
connecting a first coil and a second coil of the antenna module in parallel and allow the first coil and the second coil connected in parallel to connect with a magnetic field controller through at least one switch connected with the antenna module based on the identified first mode; and
connect the first coil of the antenna module with the magnetic field controller through the at least one switch based on the identified second mode,
wherein the first coil is disposed in a first region of the antenna module, and the second coil is disposed in a second region of the antenna module, and wherein the second region surrounds the first region.

9. A multi-coil antenna, comprising:
a dielectric substrate;
a first coil wound about a first region of the multi-coil antenna on the dielectric substrate;
a second coil wound about a second region of the multi-coil antenna surrounding the first region, on the dielectric substrate; and
a capacitor,
wherein the first coil and the second coil are connected in parallel and each have a designated number of turns for wirelessly transmitting power, and
wherein the capacitor has a designated capacitance associated with an inductance and resistance for wirelessly transmitting power through the first coil and the second coil connected in parallel.

10. The multi-coil antenna of claim 9, comprising an overlapping region between the first region and the second region.

11. The multi-coil antenna of claim 10, wherein two layers of the first coil are disposed in the first region, two layers of the second coil are disposed in the second region, and one layer of the first coil and one layer of the second coil are disposed in the overlapping region.

12. The multi-coil antenna of claim 10, wherein a first number of turns of the first coil at least partially overlap with a second number of turns of the second coil in the overlapping region,
wherein the first coil spans from a first point at a boundary between the first region and the overlapping region to a second point inside the first region, and
wherein the second coil spans from the first point to a third point at an outer boundary of the second region.

13. The electronic device of claim 1, wherein at least part of the first coil overlaps with at least part of the second coil in an overlapping region between the first region and the second region.

* * * * *